US 6,396,794 B1

(12) United States Patent
Tsugami et al.

(10) Patent No.: US 6,396,794 B1
(45) Date of Patent: May 28, 2002

(54) DISC RECORDING AND/OR REPRODUCING DEVICES WITH DISC EXCHANGING FUNCTION

(75) Inventors: Takashi Tsugami; Akihisa Inatani; Junzo Kumakura, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/939,261

(22) Filed: Sep. 29, 1997

(30) Foreign Application Priority Data

Oct. 4, 1996 (JP) ............................ 8-263948
Nov. 1, 1996 (JP) ............................ 8-291357

(51) Int. Cl.$^7$ .......................... B11B 17/04; B11B 17/08
(52) U.S. Cl. ..................................... 369/178
(58) Field of Search ..................... 369/36, 75.1, 75.2, 369/77.1, 77.2, 178

(56) References Cited

U.S. PATENT DOCUMENTS

| 4,811,319 A | * | 3/1989 | Ikedo et al. ................ 369/39 |
| 5,452,280 A | * | 9/1995 | Yamamori et al. .......... 369/77.2 |
| 5,508,994 A | * | 4/1996 | Nakamichi et al. .......... 369/192 |
| 5,537,378 A | * | 7/1996 | Uehara et al. ............... 369/77.2 |
| 5,726,828 A | * | 3/1998 | Kakuta et al. .............. 360/98.01 |
| 5,751,687 A | * | 5/1998 | Ariyoshi et al. ............. 369/202 |
| 5,757,740 A | * | 5/1998 | Osada ........................ 369/36 |
| 5,870,360 A | * | 2/1999 | Ito et al. .................... 369/36 |

* cited by examiner

Primary Examiner—Brian E. Miller
Assistant Examiner—Tod Kupstas
(74) Attorney, Agent, or Firm—Oblon, Spivak, McClelland, Maier & Neustadt, P.C.

(57) ABSTRACT

A recording and reproducing device adapted to a cartridge accommodating a recordable optical disc includes a holder arranged to a device main body and having an opening formed on the front side of the device main body and for holding the cartridge inserted from the opening thereof. A recording and reproducing part is arranged to record and reproduce information on the disc, and a carrier is movably arranged between the holder and the recording and reproducing part for transferring the cartridge from the holder to the part. A locking unit arranged to lock the cartridge held by the holder includes a lock lever including a first protrusion engaged with the cartridge normally inserted from the opening of the holder and a second protrusion for preventing error insertion of the cartridge therefrom.

31 Claims, 35 Drawing Sheets

DISC RECORDING AND/OR REPRODUCING DEVICES WITH DISC EXCHANGING FUNCTION

BACKGROUND OF THE INVENTION

The present invention relates generally to disc recording and/or reproducing devices using magneto-optical disc cartridges and having ejectors adapted thereto, and more particularly, to the disc recording and/or reproducing devices with disc exchanging function.

There is known, for example, a disc recording and/or reproducing device for recording and/or reproducing a magneto-optical disc of 64 mm diameter accommodated in a disc cartridge. With this device, the disc cartridge is loaded, for recording and/or reproducing operation, onto a recording and/or reproducing part through a cartridge holder for holding the disc cartridge. Upon this loading, a shutter of the disc cartridge is opened by a shutter lever.

With the known disc recording and/or reproducing device, however, since an error-insertion protector protrusion is generally integrated with the moving cartridge holder at the inside thereof, it is difficult to judge error insertion of the disc cartridge into the cartridge holder, which may cause a breakdown of the shutter lever, etc. Note that disc recording and/or reproducing devices having cartridge autochangers have not been developed yet which can continuously record and/or reproduce magneto-optical discs of 64 mm diameter accommodated in the disc cartridges.

Moreover, with the above known device, for exchange of a disc cartridge after recording and/or reproducing operation, an eject button arranged, e.g. on the front of the device is pressed to eject the disc cartridge outside. In this connection, disc recording and/or reproducing devices having cartridge changers have been proposed which can continuously record and/or reproduce discs. Those devices generally adopt a structure having a cartridge ejector for ejecting the disc cartridge outside, joined to a cartridge-holder portion of a cartridge loader for loading or unloading a disc cartridge.

With the known disc recording and/or reproducing devices having cartridge changers, however, due to the combined structure of a cartridge ejector for ejecting the disc cartridge outside and a cartridge-holder portion of a cartridge loader for moving a disc cartridge horizontally or vertically, the disc cartridge cannot be ejected and exchanged for another during recording or reproducing operation. Moreover, the cartridge ejector has two separate portions, i.e. a cartridge-holder portion and a device main-body portion, having increased number of parts, resulting in cost up and complicated structure of the whole device.

It is, therefore, an object of the present invention to provide disc recording and/or reproducing devices using magneto-optical disc cartridges and having ejectors adapted thereto, which contribute to simplified device structure and reduced manufacturing cost.

SUMMARY OF THE INVENTION

According to one aspect of the present invention, there is provided a recording and reproducing device adapted to a cartridge accommodating a recordable optical disc, the cartridge being formed with an opening and a groove in one side face thereof, the cartridge including a shutter for opening and closing the opening through the groove, the device comprising:

at least one holder arranged to a main body of the device, said holder being formed with an opening on the front side of said main body, said holder holding the cartridge inserted from said opening of said holder;

a recording and reproducing part arranged to record and reproduce information on the disc;

a carrier movably arranged between said holder and said part, said carrier transferring the cartridge from said holder to said part; and a locking unit arranged to lock the cartridge held by said holder, said locking unit including a lock lever including a first protrusion engaged with the cartridge normally inserted from said opening of said holder and a second protrusion for preventing error insertion of the cartridge therefrom.

Another aspect of the present invention lies in providing a recording and reproducing device adapted to cartridges accommodating recordable optical discs, each cartridge being formed with an opening and a groove in one side face thereof, each cartridge including a shutter for opening and closing the opening through the groove, the device comprising:

holders arranged to a main body of the device, each holder being formed with an opening on the front side of said main body, each holder holding the cartridge inserted from said opening of said holder;

a recording and reproducing part arranged to record and reproduce information on the disc;

a carrier movably arranged between said holder and said part, said carrier transferring the cartridge from said holder to said part; and a locking unit arranged to lock the cartridge held by said holder, said locking unit including lock levers for locking the cartridges in said holders, each lock lever including a first protrusion engaged with the cartridge normally inserted from said opening of said holder and a second protrusion for preventing error insertion of the cartridge therefrom.

Still another aspect of the present invention lies in providing a device for ejecting a disc cartridge, the disc cartridge being formed with an opening and a groove in one side face thereof, the cartridge including a shutter for opening and closing the opening through the groove, the device comprising:

at least one holder arranged to a main body of the device, said holder being formed with an opening on the front side of said main body, said holder holding the cartridge inserted from said opening of said holder; and an ejector arranged to eject the disc cartridge held by said holder, said ejector including at least one eject button arranged to said main body of the device, an eject lever operated by said eject button, and a resilient unit for returning said eject lever to an initial position, said eject lever being rotatably arranged between a first position where it protrudes in said holder to eject the disc cartridge held thereby and a second position where it withdraws from said holder, wherein when operating said eject button, said eject lever is moved from said second position to said first position to engage with an end of the groove of the disc cartridge held by said holder for ejection thereof.

Still another aspect of the present invention lies in providing a device for ejecting disc cartridges, each disc cartridge being formed with an opening and a groove in one side face thereof, each cartridge including a shutter for opening and closing the opening through the groove, the device comprising:

holders arranged to a main body of the device, each holder being formed with an opening on the front side of said main body, each holder holding the cartridge inserted from said opening of said holder; and ejectors arranged to eject the disc cartridges held by said holders, said ejectors including eject buttons arranged to said main body of the device, eject levers operated by said eject buttons, and resilient units for returning said eject levers to initial positions, each eject lever being rotatably arranged between a first position where it protrudes in said holder to eject the disc cartridge held thereby and a second position where it withdraws from said holder, wherein when operating one of said eject buttons, said eject lever corresponding thereto is moved from said second position to said first position to engage with an end of the groove of the disc cartridge held by said holder for ejection thereof.

A further aspect of the present invention lies in providing a device for recording and reproducing magneto-optical discs, comprising:

holders arranged to hold the discs;

a recording and reproducing part arranged to record and reproduce information on the disc, said part including a magnetic head for providing an external magnetic field to the disc and an optical pickup for applying light beam thereto;

a carrier movably arranged between said holder and said part, said carrier transferring the disc from said holder to said part; and a head mover arranged to move said magnetic head to a predetermined position for recording information on the disc, said head mover moving said magnetic head out of a transfer course of said carrier at least when the disc is transferred by said carrier.

A still further aspect of the present invention lies in providing a recording and reproducing device adapted to cartridges accommodating recordable optical discs, the device comprising:

holders arranged to hold the cartridges;

a recording and reproducing part arranged to record and reproduce information on the disc, said part including an optical pickup for applying light beam o the disc and a drive for rotating the disc;

a damper arranged between said part and a main body of the device;

a carrier movably arranged between said holder and said part, said carrier transferring the cartridge from said holder to said part, said carrier including a sub holder movably arranged thereto for holding the cartridge taken out from said holder, whereby said part having the cartridge disposed thereon and said sub holder are movable with respect to said main body of the device and said carrier.

DETAILED DESCRIPTION OF THE INVENTION

Figure 1:
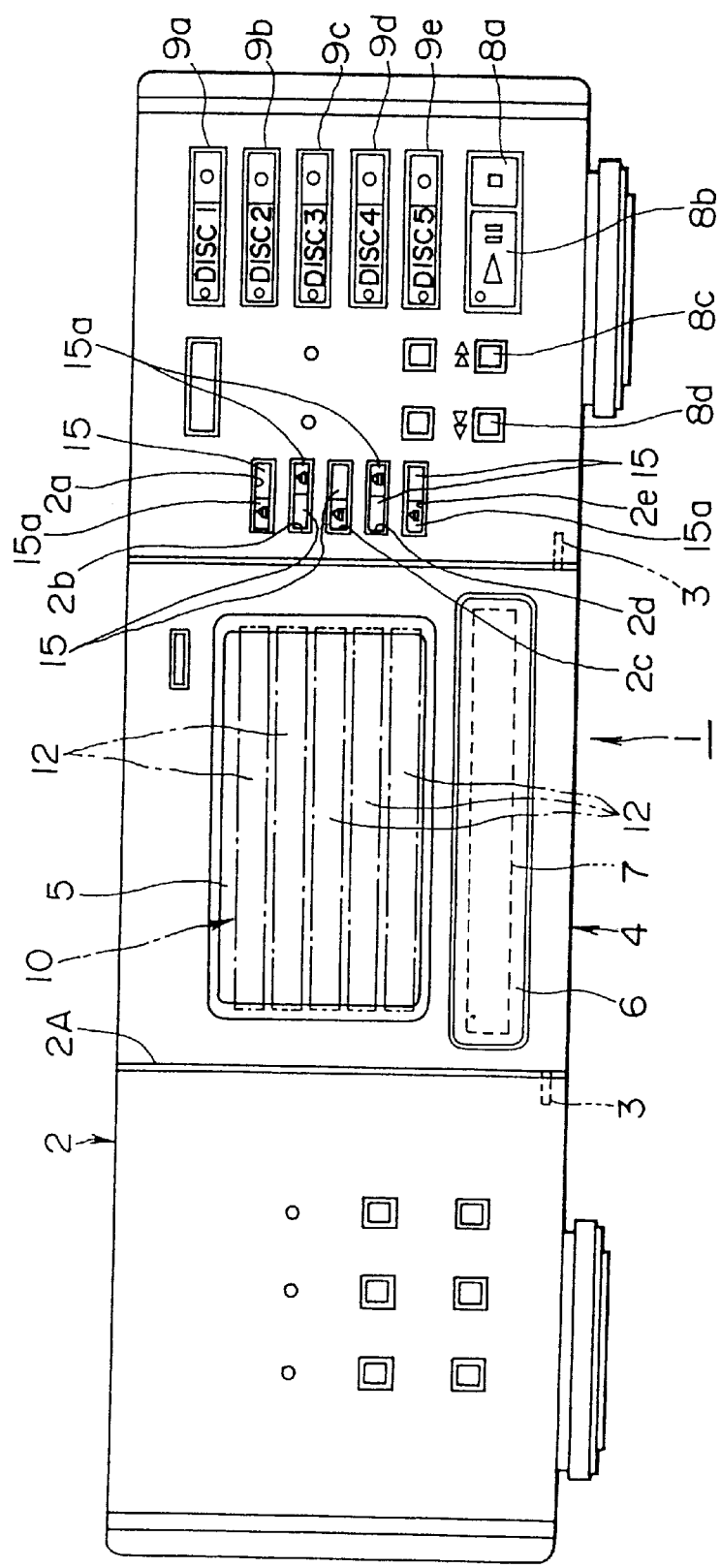
FIG. 1 is a front view showing an embodiment of a disc recording and/or reproducing device with a cartridge changer according to the present invention.

Referring to the drawings, a description will be made with regard to a preferred embodiment of a disc recording and/or reproducing device according to the present invention.

Figure 2:
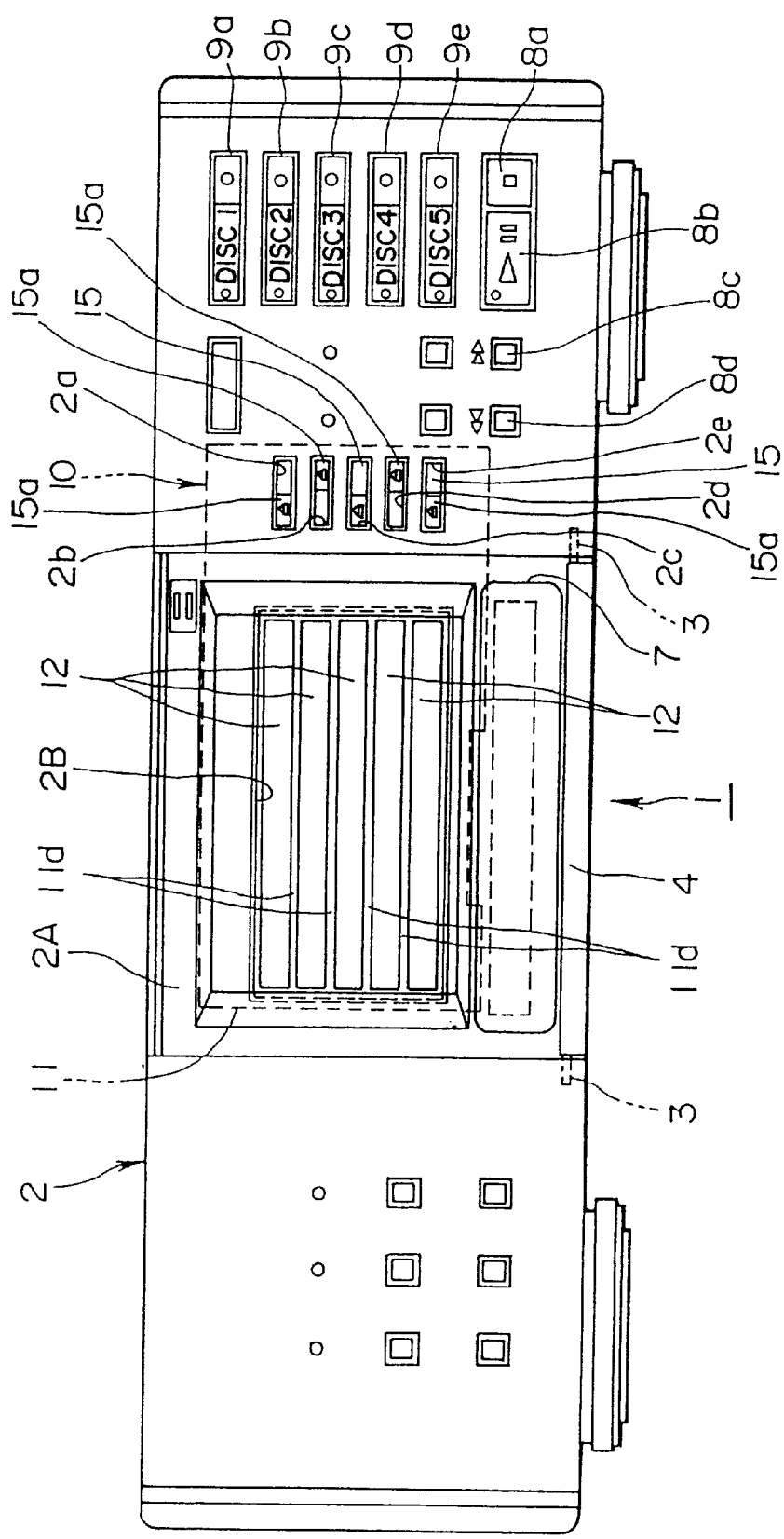
FIG. 2 is a view similar to FIG. 1, showing the disc recording and/or reproducing device with a front cover opened.

Referring to FIGS. 1–2, a disc recording and/or reproducing device, designated generally by reference numeral 1, is adapted to disc cartridges 200 (see, e.g. FIG. 9) having therein magneto-optical discs 210 as a recordable optical disc, and has a function of exchanging the disc cartridge 200. In this embodiment, the magneto-optical discs 210 are five in number, each having a 64 mm diameter and being accommodated in a thin box-like main body 201 of the disc cartridge 200. A cartridge ejector 10 is arranged in a box-like main body 2 of the disc recording and/or reproducing device 1 substantially in the center thereof so as to eject the disc cartridges 200 separately.

As shown in FIGS. 1–2, the center of a front panel of the device main body 2 is formed with a concavity 2A in which a cover 4 is supported through a pair of support shafts 3 to be movable from the vertically standing or closed state to the horizontally extending or open state. The cover 4 has large and small rectangular transparent windows 5, 6 formed in the center and lower portions thereof, respectively, so as to allow, with the cover 4 closed, seeing of five rectangular openings 12 of the cartridge ejector 10 for receiving the disc cartridges 200 through the center window 5, and a display 7 through the lower window 6.

A stop button 8a, a recording/reproducing button 8b, a review button 8c, and a cue button 8d are arranged in the lower portion of the front panel of the device main body 2 from right to center, whereas five indicators 9a–9e are arranged in the right portion thereof from above downward. Each indicator 9a–9e serves to show presence of the corresponding disc cartridge 200 and execution of recording/reproducing operation thereof. By way of example, when the magneto-optical disc 210 (see "DISC 1" in FIGS. 1–2) of the disc cartridge 200 received in the uppermost opening 12 is in recording operation, a red light-emitting diode (LED) is turned on, whereas when it is in reproducing operation, a green LED is turned on. A large rectangular opening 2B is arranged in the front panel of the device main body 2 in the center of the concavity 2A, whereas five small rectangular openings 2a–2e are vertically equidistantly arranged therein between the concavity 2A and the indicators 9a–9e.

As shown in FIG. 2, the cartridge ejector 10 is arranged to the front panel of the device main body 2 to extend from the concavity 2A to the five openings 2a–2e. Referring to FIGS. 3–7, the cartridge ejector 10 constitutes a unit, and comprises a holder 11, five eject levers 14 rotatably supported in a box 13 arranged in the right portion of the holder 11, five eject buttons 15 slidably supported in the box 13, a mounting plate 16 screwed to the rear of the box 13, and extension coil springs 17 each interposed between the eject lever 14 and the mounting plate 16.

Figure 3:
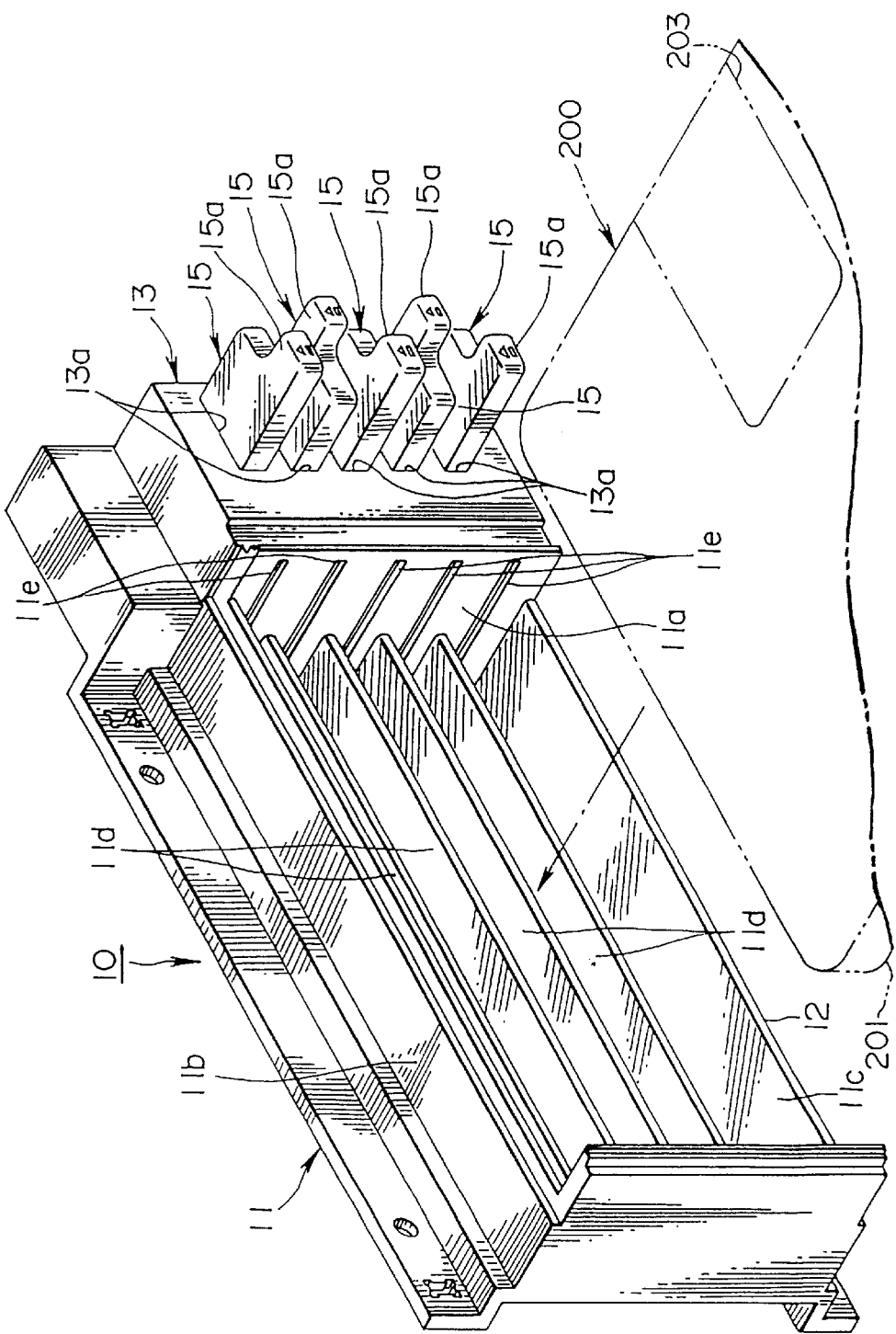
FIG. 3 is a perspective view showing a cartridge ejector.
Figure 4:
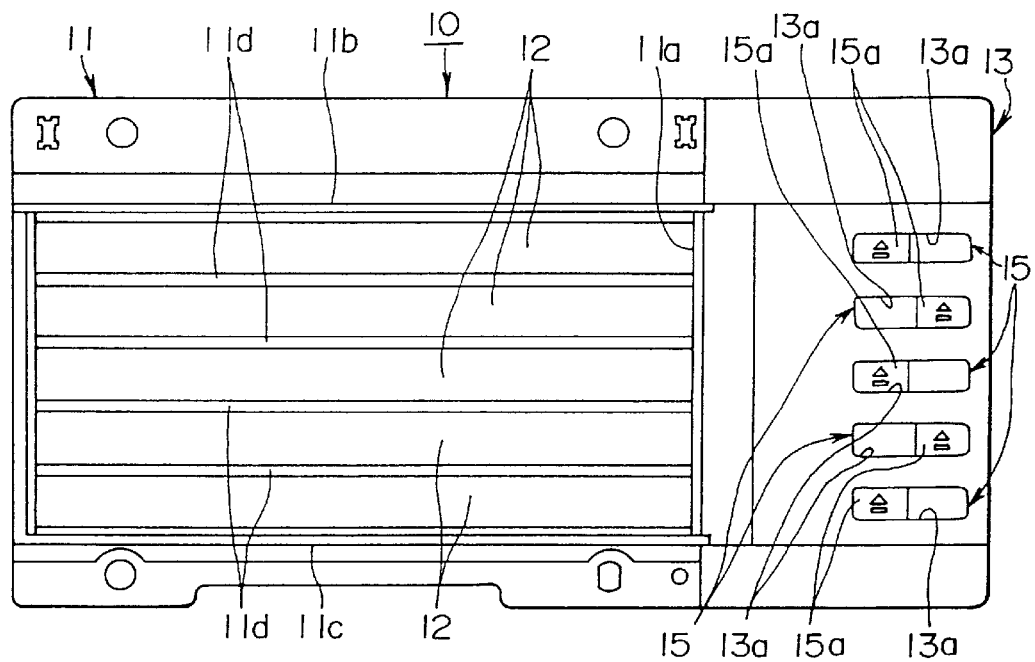
FIG. 4 is a view similar to FIG. 2, showing the cartridge ejector.
Figure 5:
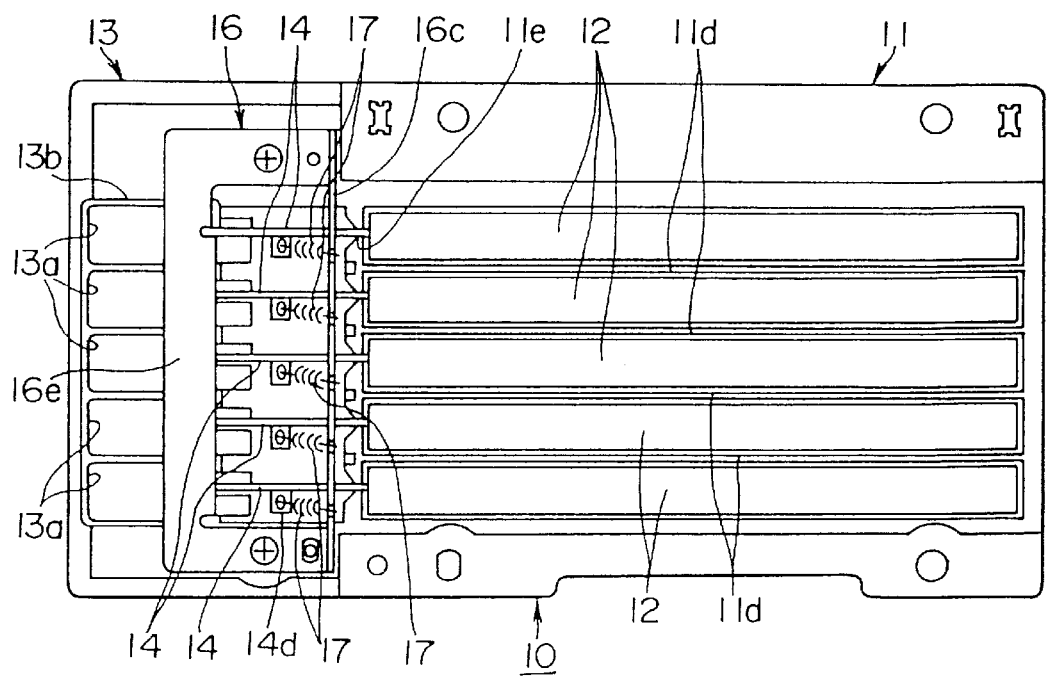
FIG. 5 is a rear elevation showing the cartridge ejector.
Figure 8:
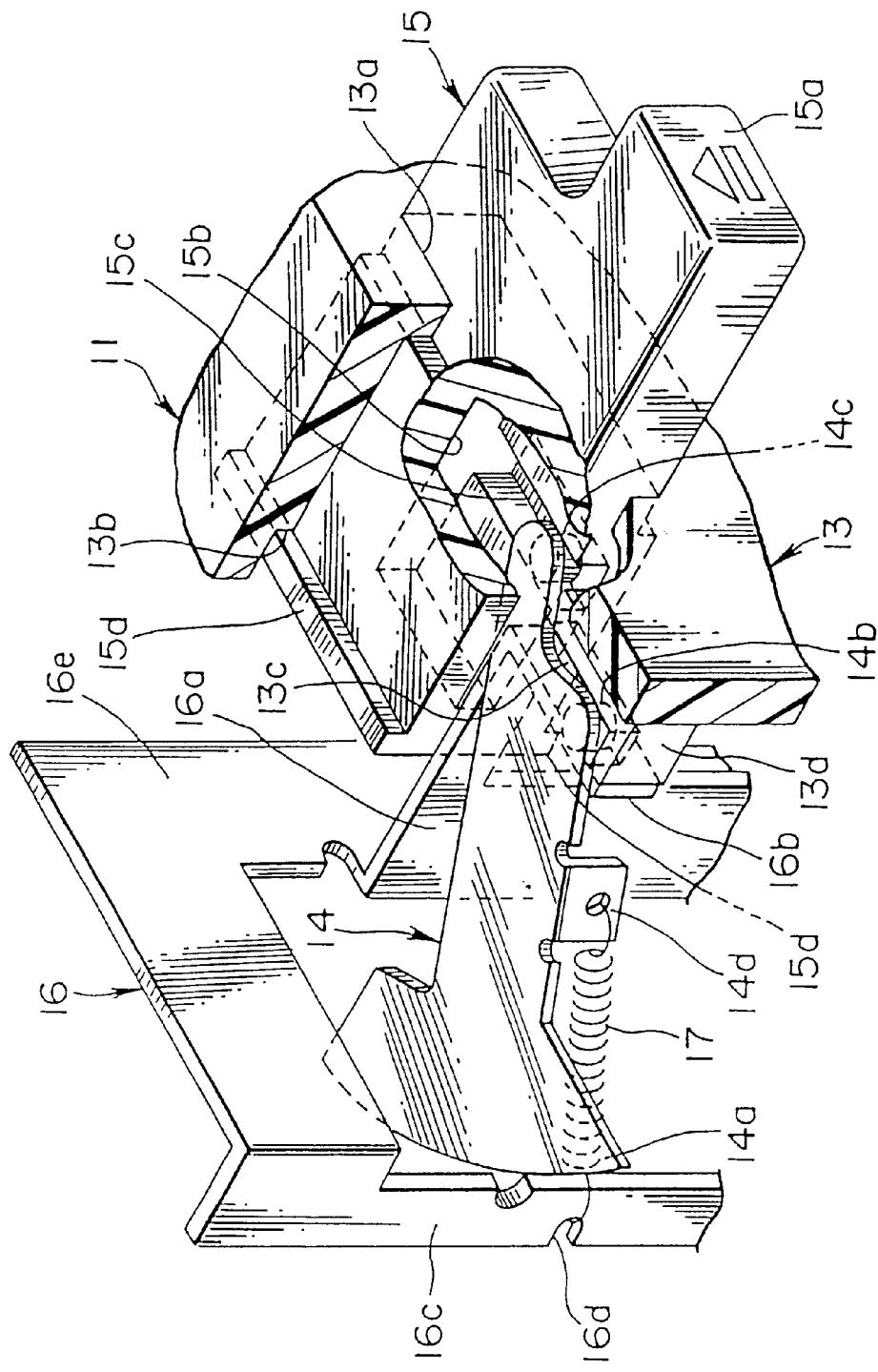
FIG. 8 is an enlarged perspective view, partly in section, showing the cartridge ejector.

As shown in FIGS. 3–5, the holder 11 which constitutes a main body of the cartridge ejector 10 is made of synthetic resin to be like substantially a rectangular tube, and has a right wall 11a with which the box 13 is integrated. The five rectangular openings 12 for receiving the disc cartridges 200 are defined by four partitions 11d equidistantly arranged to be parallel to upper and lower walls 11b, 11c of the holder 11. That is, the five openings 12 are vertically arranged so that the adjacent two are separated by a small clearance corresponding to the thickness of the partition 11d. Five slits 11e are equidistantly formed in the right wall 11a of the holder 11, each slit being in a middle position between the wall 11b, 11c and the partition 11d or between the two partitions 11d. Referring to FIGS. 3–8 and 35–37, five rectangular-tube-like openings 13a are vertically equidistantly formed in the front of the box 13 of the holder 11, wherein the five eject buttons 15 are supported to be slidable in the cross direction. Each opening 13a of the box 13 has stepped portions 13b formed on the upper and lower sides thereof, and a horizontal guide recess 13c formed on the side of the right wall 11a as shown in FIG. 8.

Figure 6:
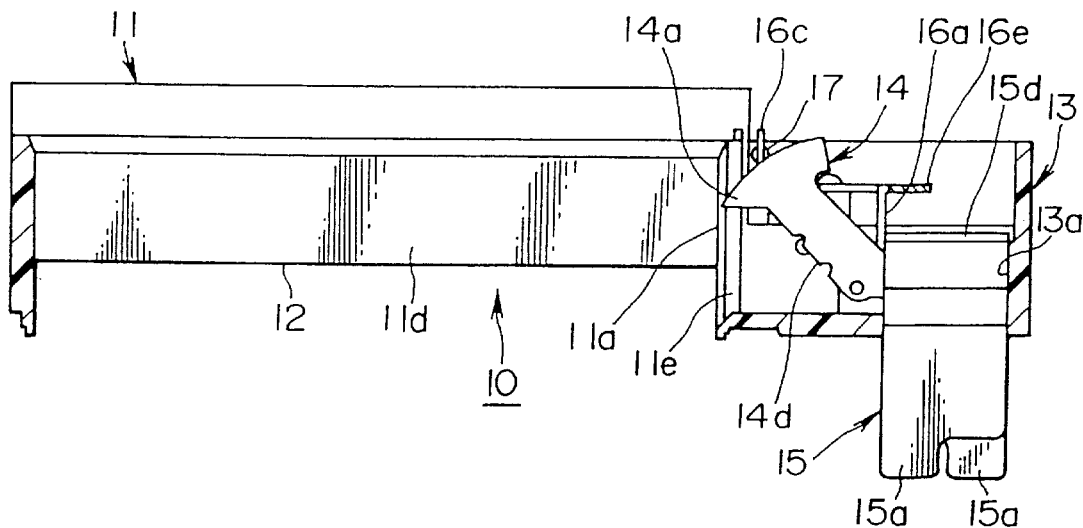
FIG. 6 is a fragmentary longitudinal section showing the cartridge ejector.
Figure 7:
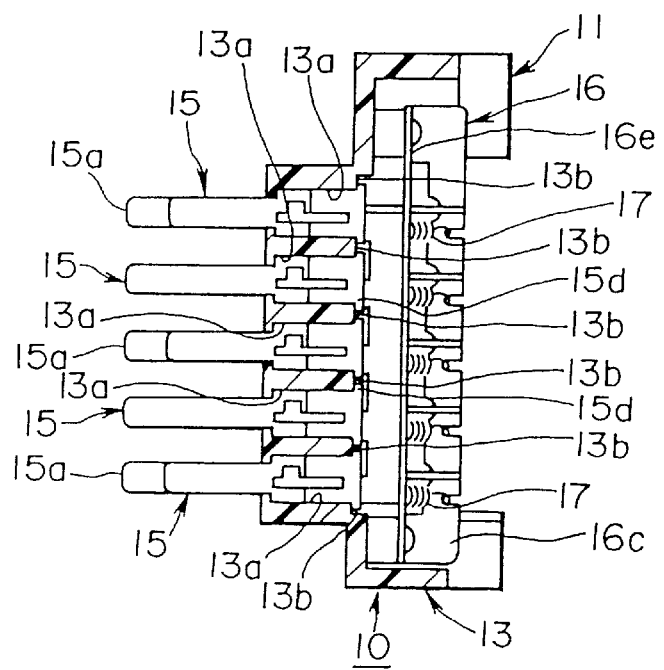
FIG. 7 is a fragmentary cross section showing the cartridge ejector.

Referring to FIGS. 6 and 8, the eject lever 14 is formed from a metal plate to have substantially a T-shape, and has an end 14a which protrudes into the opening 12 of the holder 11 and withdraws in the box 13 thereof through the slit 11e of the right wall 11a. The eject lever 14 has a metallic cylindrical support pin 14b and engaged pin 14c arranged on the lower side of the base and the base end thereof through a predetermined means such as caulking, and a bend 14d formed in the center of the edge thereof on the side of the support pin 14b. The support pin 14b of the eject lever 14 is supported to horizontally be movable between an L-shaped protrusion 13d of the horizontal guide recess 13c of the box 13 and one side (left side face in FIG. 8) of the eject button 15, and to be rotatable on the side of the protrusion 13d of the horizontal guide recess 13c.

As shown in FIGS. 1–4, an operation part 15a of the eject button 15 exposed from the opening 13a of the box 13 (which corresponds to the opening 2a–2e of the front panel of the device main body 2) is constructed such that the right and left halves protrude alternately. As shown in FIGS. 8 and 35–37, the eject button 15 has a hollow 15b formed in the one side thereof from the center to the rear, and a guide groove 15c formed on the lower side of the hollow 15b to be parallel to the horizontal guide recess 13c of the box 13. The eject lever 14 has the base end inserted in the hollow 15b of the eject button 15, and the engaged pin 14c loosely engaged with the guide groove 15c of the hollow 15b of the eject button 15. The eject button 15 has flanges 15d integrated with the upper and lower sides thereof, which abut on the stepped portion 13b of the opening 13a of the box 13 to prevent the eject button 15 from coming off from the front side thereof.

Referring to FIGS. 5–8, the mounting plate 16 is formed by bending a center portion of a rectangular metal plate to have a frame-like shape with an opening. A bend 16a of the mounting plate 16 has an end 16b having five bends formed vertically equidistantly, each abutting on the horizontal guide recess 13c of the box 13 to prevent the support pin 14b of the eject lever 14 from coming off from the horizontal guide recess 13c. A bend 16c of the mounting plate 16 on the side of the end 14a of the eject lever 14 has five U-shaped recesses 16d formed vertically equidistantly. Both ends of the extension coil spring 17 are engaged with the recess 16d of the bend 16c and the bend 14d of the eject lever 14, respectively. A resilient tensile force of the extension coil spring 17 makes the eject lever 14 and the eject button 15 return to the initial positions or the states as shown in FIG. 8, i.e. the state that the end 14a withdraws in the box 13 for the former, and the state that the flange 15d abuts on the stepped portion 13b of the box 13 for the latter. A frame 16e of the mounting plate 16 on the side of the bend 16a serves as a stopper on which the rear (flange 15d) of the eject button 15 abuts.

Figure 9:
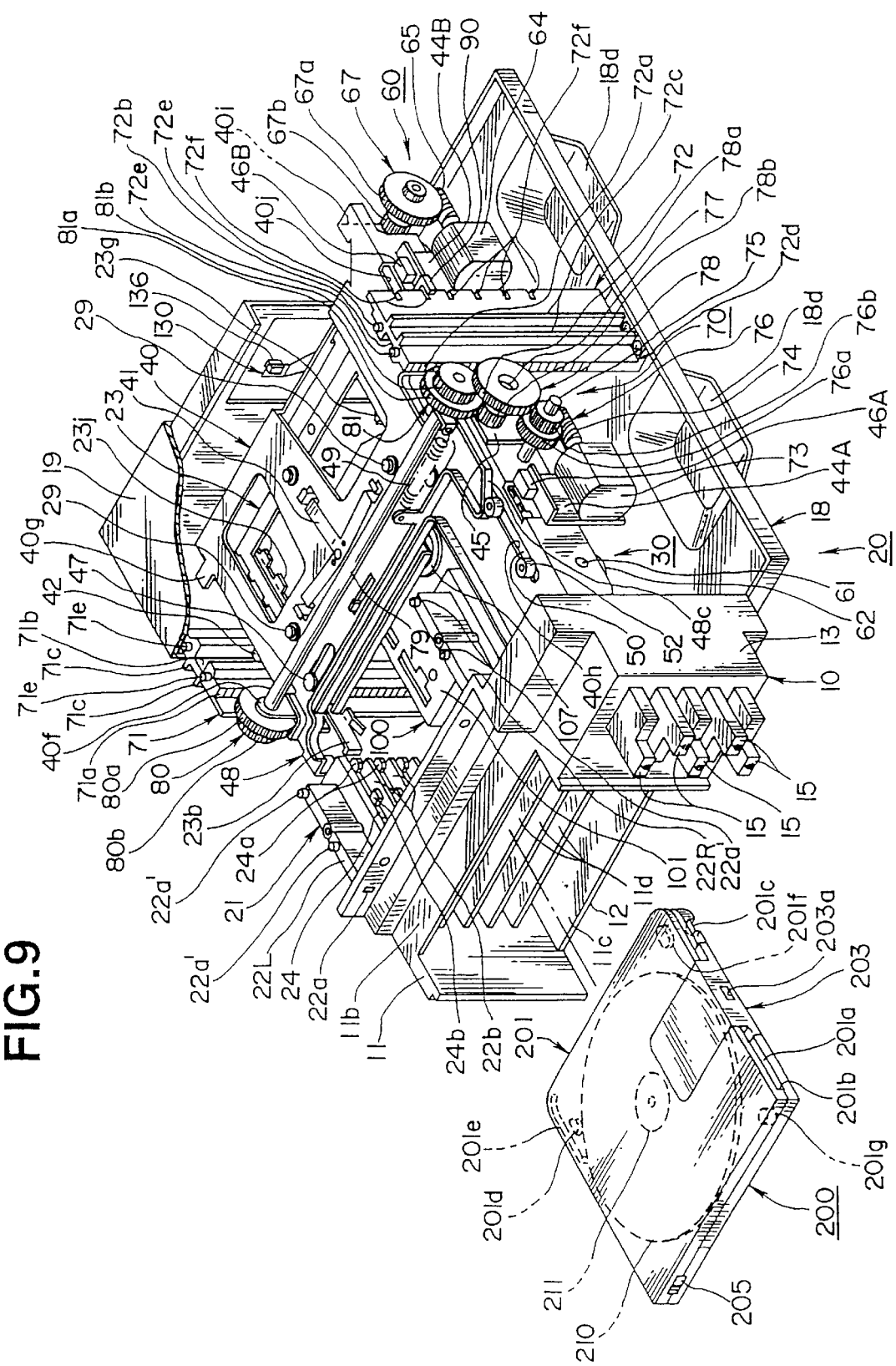
FIG. 9 is a view similar to FIG. 3, showing the cartridge changer and a disc cartridge.
Figure 10:
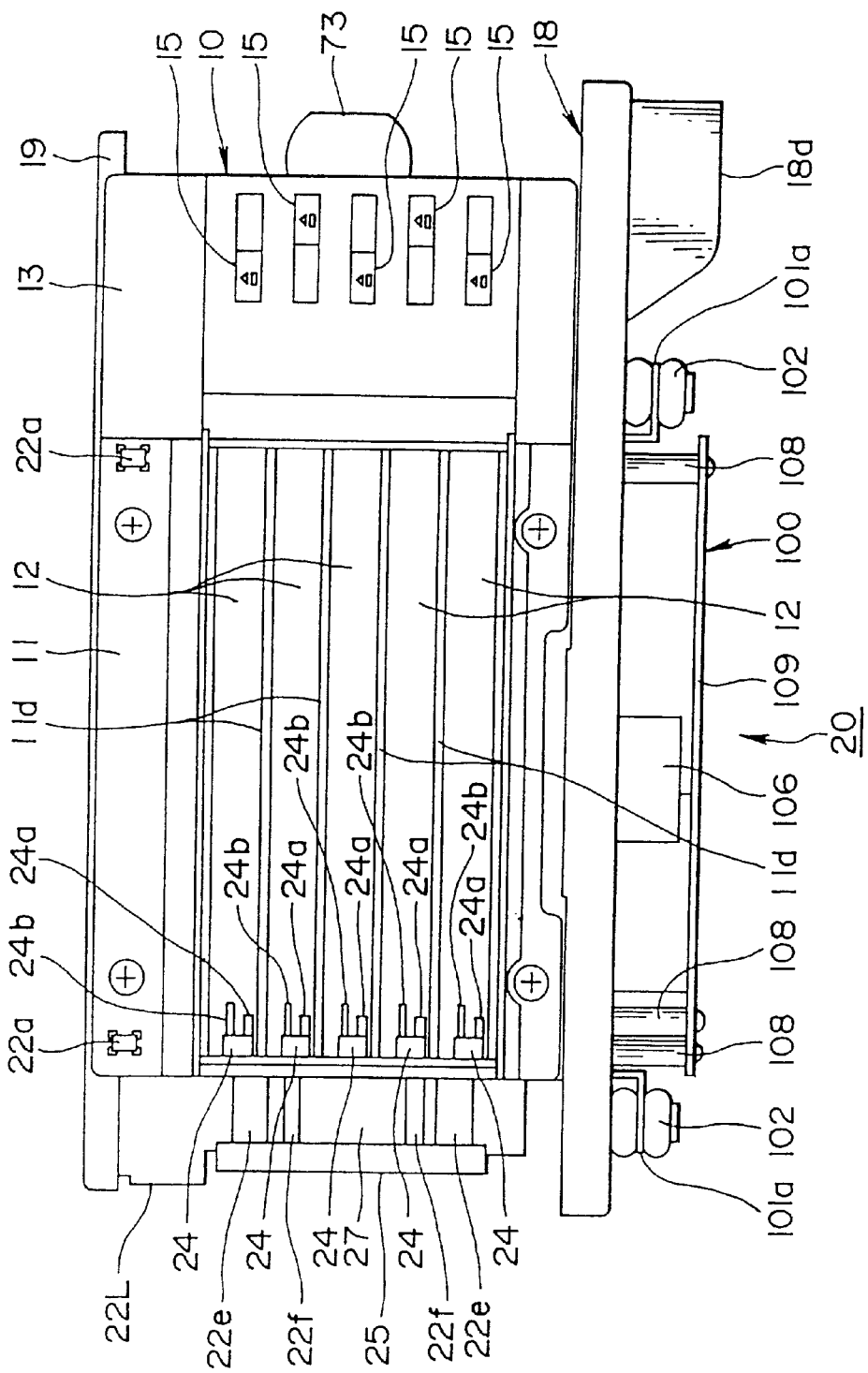
FIG. 10 is a view similar to FIG. 4, showing the cartridge changer.

Referring to FIG. 9, arranged in the main body 2 of the disc recording and/or reproducing device 1 in the rear of the cartridge ejector 10 is a cartridge changer 20 for transporting one of the disc cartridges 200 accommodated in the openings 12 to a recording and/or reproducing part 100 and a recording head 130 as will be described later, or returning the disc cartridge 200 to the corresponding opening 12 to automatically exchange it for another. The cartridge changer 20 comprises a cartridge holder 21 for holding the disc cartridge 200 accommodated in the opening 12, a cartridge loader 30 for loading the disc cartridge 200 held by the cartridge holder 21 into the recording and/or reproducing part 100 or unloading therefrom the disc cartridge 200, and a head mover 150 for moving the recording head 130 from a vertical locus of a cartridge carrier 31 of the cartridge loader 30, and constitutes a unit having the cartridge ejector 10 and mounted on a lower chassis 18 disposed in the lower portion of the device main body 2.

Figure 13:
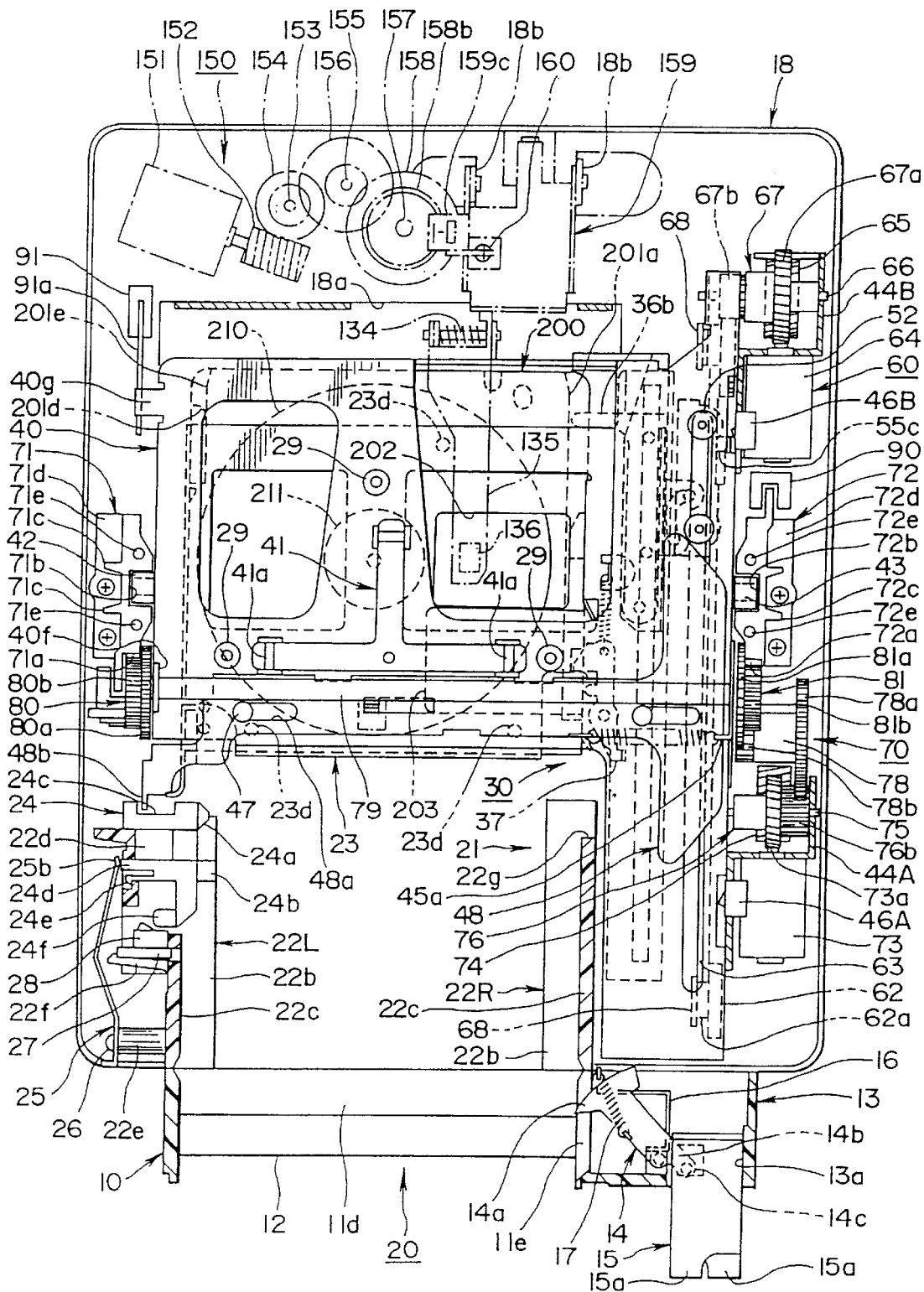
FIG. 13 is a plan view, partly in section, showing the cartridge changer.

As shown in FIGS. 9 and 13, the cartridge holder 21 comprises a pair of main holders 22L, 22R fixed to the front of the lower chassis 18 disposed in the device main body 2, and a sub holder 23 for holding the disc cartridge 200 transferred from the main holders 22L, 22R through the cartridge loader 30 and being vertically movable by an elevator chassis 40 of the cartridge loader 30 with respect to the recording and/or reproducing part 100 floatably disposed on the lower chassis 18.

Referring to FIGS. 9–12, the main holders 22L, 22R of synthetic resin have protrusions 22a, 2a' integrated with the upper portion of the front face thereof and the upper and lower sides thereof. The main holders 22L, 22R are engaged with the holder 11 of the cartridge ejector 10 and the lower and upper chassis 18, 19 disposed in the device main body 2 through the protrusions 22a, 22a', and they are fixed to the lower and upper chassis 18, 19 by screws, etc. Five C-shaped holder portions 22b for holding the disc cartridges 200 are integrated with each main holder 22L, 22R to communicate with the openings 12 of the holder 11. Moreover, as shown in FIG. 13, a horizontal guide hole 22d is formed in the left main holder 22L in the rear of a side wall 22c to face the middle position between the holder portions 22b.

Figure 18:
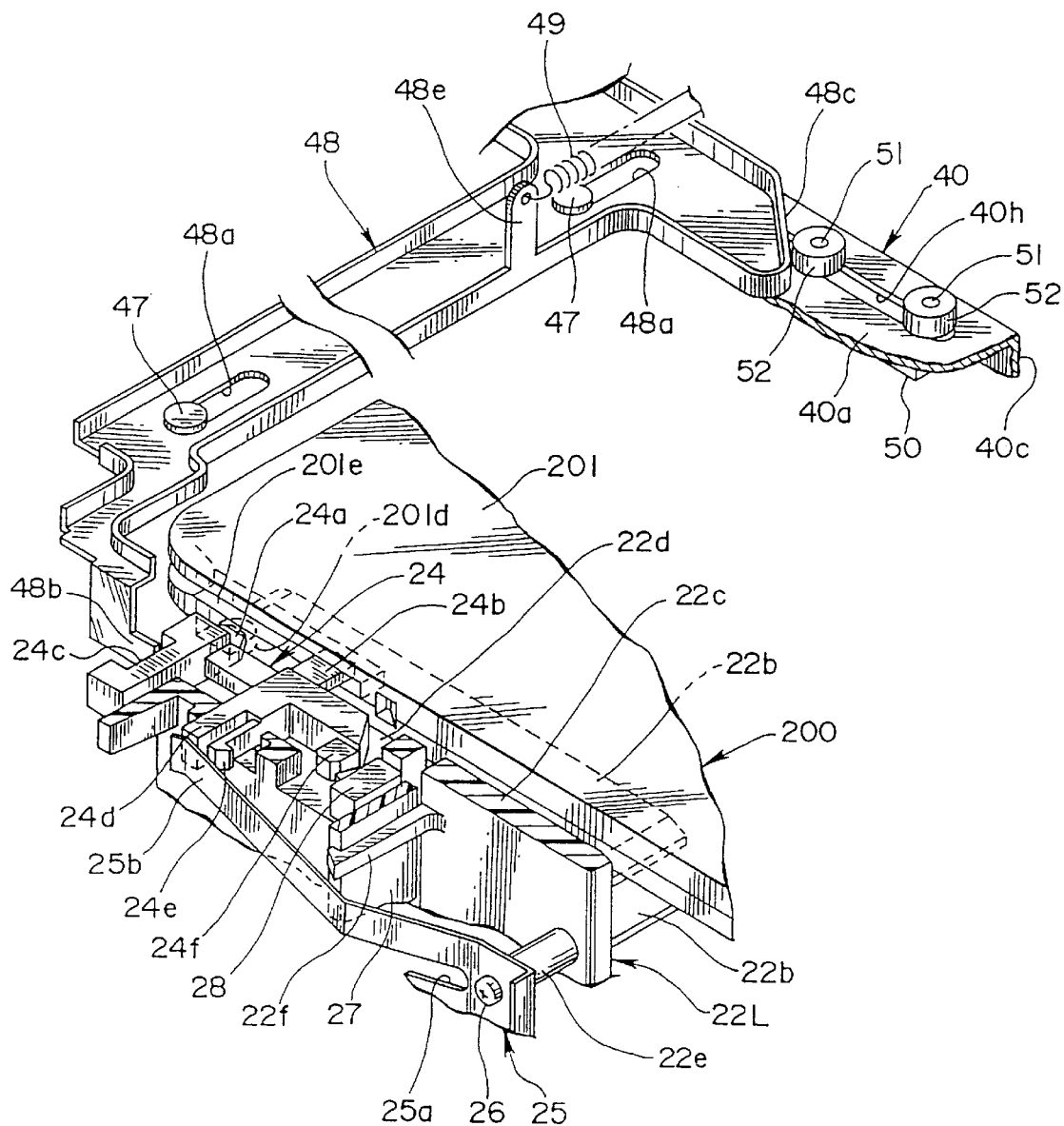
FIG. 18 is a fragmentary enlarged perspective view, partly in section, showing the cartridge changer.

Referring to FIG. 18, a substantially F-shaped lock lever 24 of synthetic resin is horizontally slidably supported to the horizontal guide hole 22d of the left main holder 22L. Integrated with the right side face of the lock lever 24 on the lower side at an end and in the center are a first thick tongue-like protrusion 24a for holding the disc cartridge 200 and a second rectangular-plate-like protrusion 24b for preventing error insertion of the disc cartridge 200. The lock lever 24 has a recess 24c formed in the left portion of the upper side thereof, and a presser 24d formed in the upper portion of the center of the left side face thereof. Moreover, the lock lever 24 has an anti-detachment claw 24e and an operation part 24f for switch operation formed in the lower portion of the center of the left side face thereof.

As shown in FIG. 18, a pair of cylindrical ribs 22e is integrated with the side wall 22c of the left main holder 22L in the upper and lower portions of the front of the outer side thereof. A substantially L-shaped plate spring 25 is fixed to the rib 22e through a screw 26. The plate spring 25 has four recesses 25a formed from the end to the base, between which five resilient members 25b are arranged each having an end which biases the presser 24d of the lock lever 24. This makes the first and second protrusions 24a, 24b of the lock lever 24 protrude to the inner side of the side wall 22c of the left main holder 22L.

Figure 12:
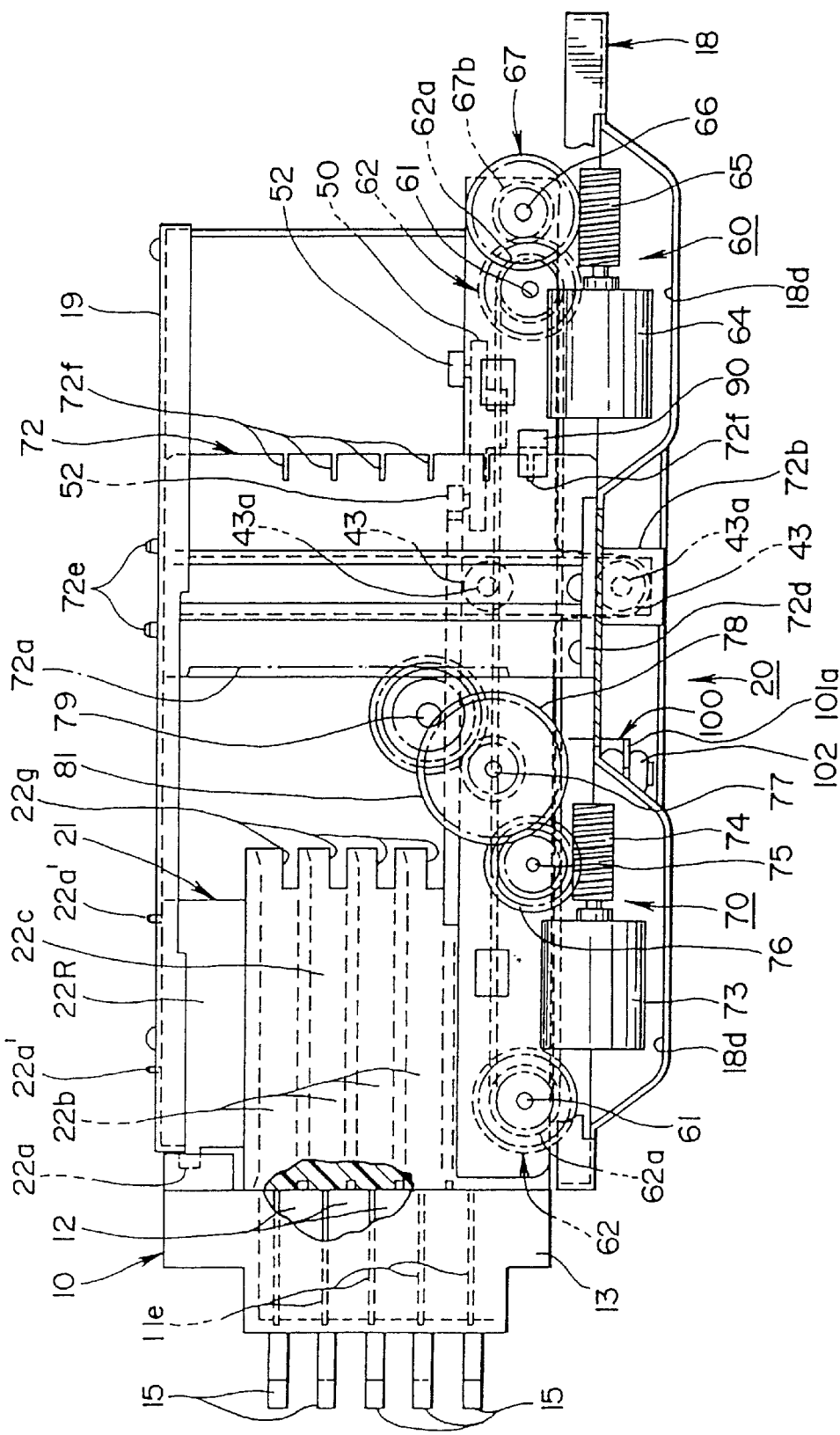
FIG. 12 is a right side view, partly in section, showing the cartridge changer.

A pair of claws 22f is integrated with the side wall 22c of the left main holder 22L in the upper and lower portions of the center of the outer side thereof. A rectangular base plate 27 is detachably engaged with the claw 22f. A detection switch 28 is mounted to the base plate 27 to face the operation part 24f of the lock lever 24. The detection switch 28 serves to detect that the first protrusion 24a of the lock lever 24 completely removes locking of the disc cartridge 200. That is, when the lock lever 24 moves leftward the horizontal guide hole 22d of the left main holder 22L against a resilient force of the resilient member 25b of the plate spring 25, the detection switch 28 is turned on by the operation part 24f of the lock lever 24 to detect a removal of locking of the disc cartridge 200. Referring to FIG. 12, the side wall 22c of the right main holder 22 are formed with recesses 22g in the lower portion of the base end thereof to receive an engagement 36b of a loading lever 36 as will be described later.

Figure 19:
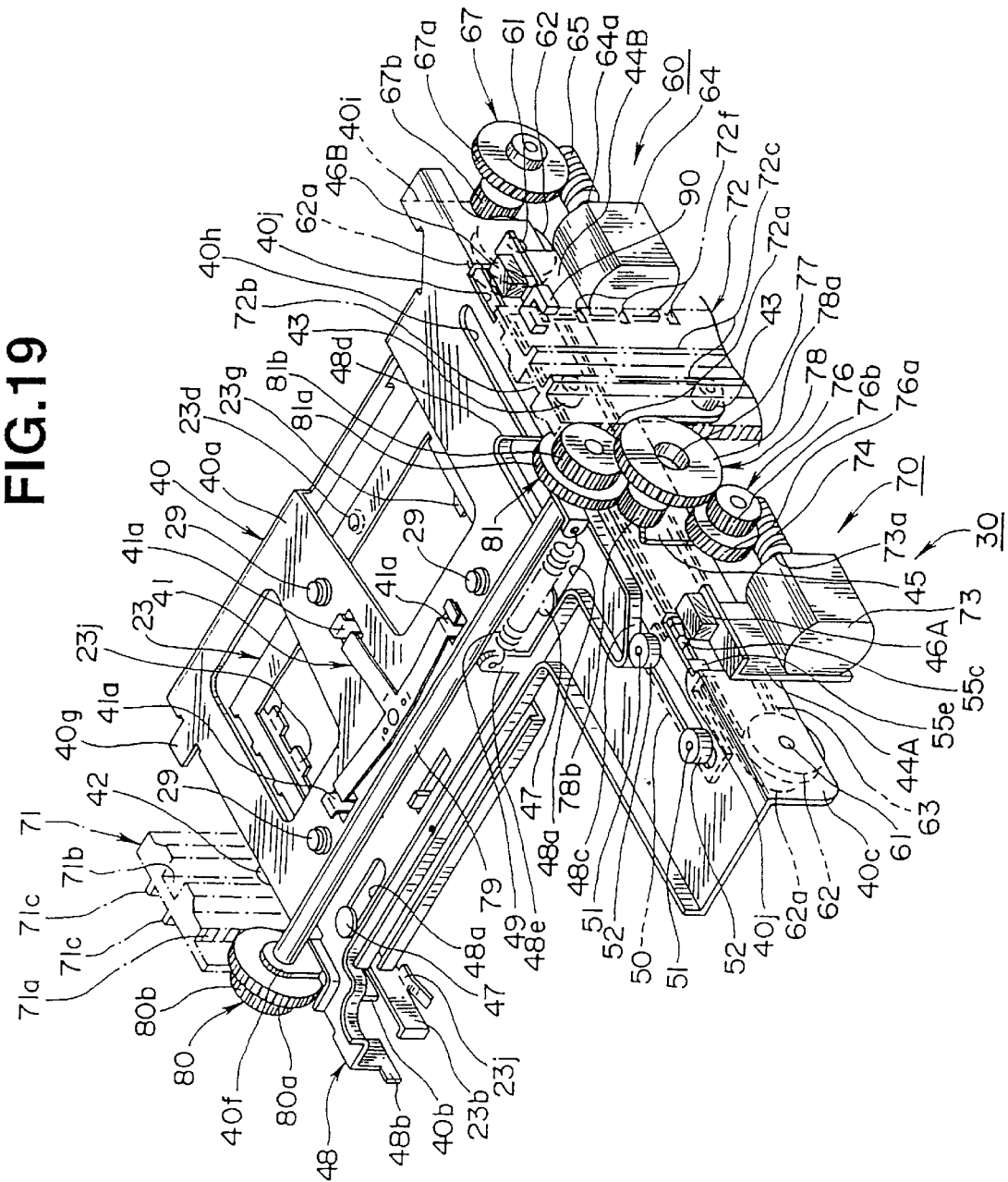
FIG. 19 is a fragmentary perspective view showing a cartridge loader.
Figure 20:
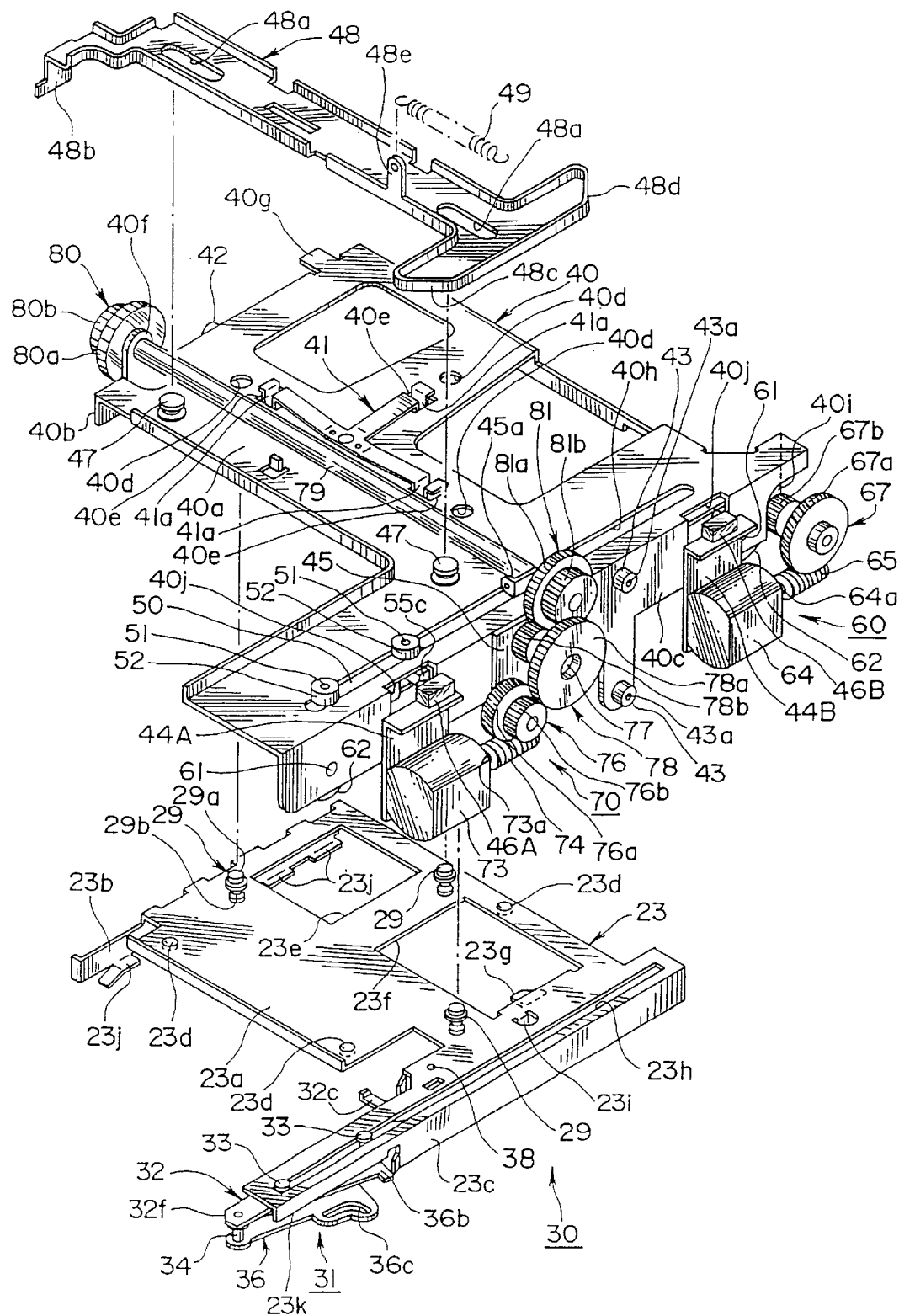
FIG. 20 is a fragmentary exploded perspective view showing the cartridge loader.

Referring to FIGS. 19–20, the sub holder 23 is formed from a metal plate, and includes an inverted L-shaped flat portion 23a and side portions 23b, 23c obtained by bending vertically downward both ends of the flat portion 23a. The sub holder 23 has three bosses 23d formed at both ends of the front of the inner side (disc-cartridge side) of the flat portion 23a and in the center of the rear thereof, and three stepped pins 29 formed at both ends of the center of the outer side of the flat portion 23a and in the center of the rear thereof. A pair of openings 23e, 23f is formed in the flat portion 23a of the sub holder 23 in the center of the rear thereof. A support 23g is formed in the center of the right edge of the right opening 23f to support the disc cartridge 200 when inserted into a slide groove 201a of the right side face thereof. The sub holder 23 has a rectangular guide groove 23h formed in the flat portion 23a on the side of the longer right side portion 23c to extend longitudinally, and an engagement 23i formed between the guide groove 23h of the flat portion 23a and the support 23g. Moreover, the sub holder 23 has disc-cartridge stages 23j obtained by bending inward the lower edge of the left side portion 23b, and a recess 23k in the lower portion of the front of the right side portion 23c.

As shown in FIGS. 19–20, the cartridge loader 30 comprises the cartridge carrier 31 reciprocatively supported by the guide groove 23h of the sub holder 23 and for loading the disc cartridge 200 held between the holder portions 22b of the main holders 22L, 22R onto the stages 23j and the support 23g of the sub holder 23, the elevator chassis 40 for vertically floatably supporting the sub holder through the three stepped pins 29, a loading slider 50 reciprocatively supported by a guide groove 40h of the elevator chassis 40 and for horizontally reciprocating the cartridge carrier 31, a first drive 60 for horizontally reciprocating the loading slider 50, and a second drive 70 for vertically moving the elevator chassis 40.

Figure 21:
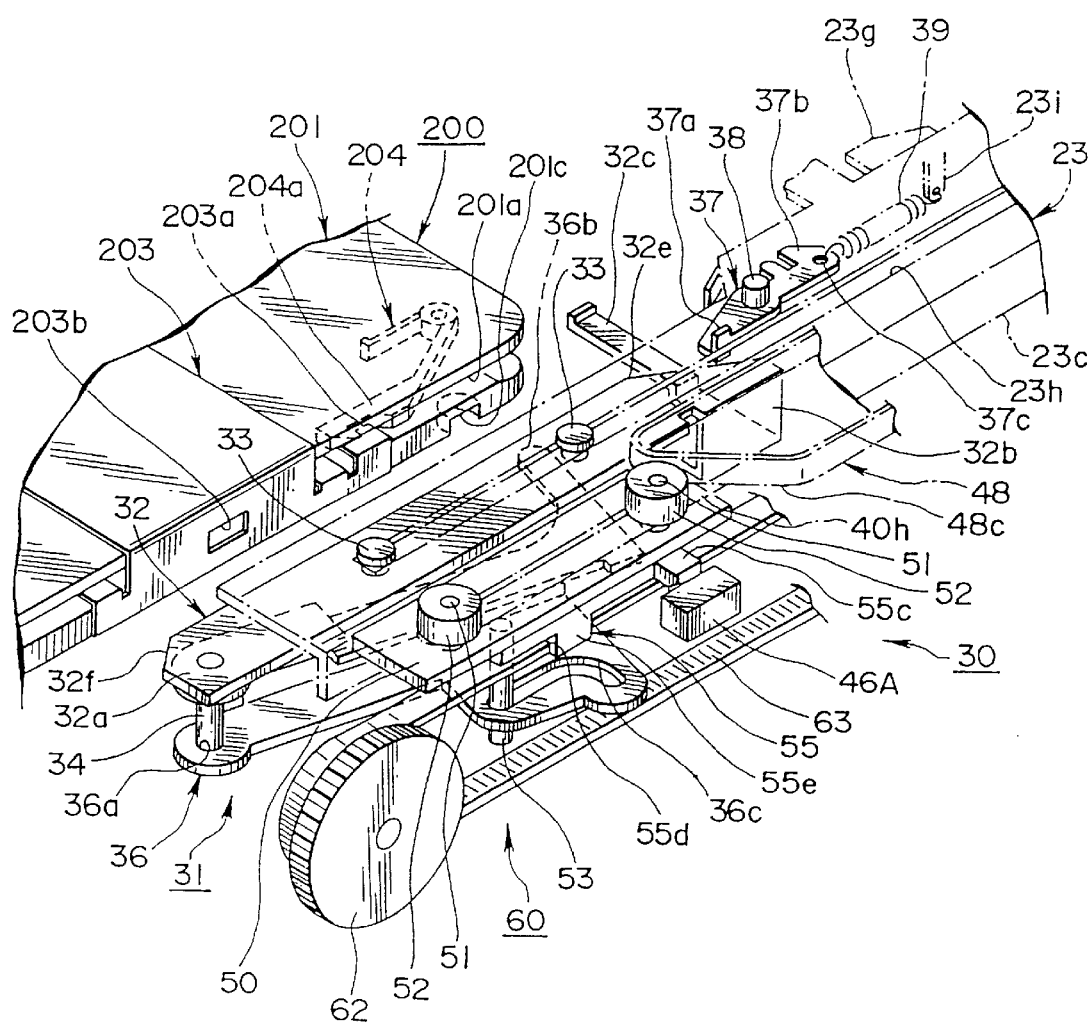
FIG. 21 is a view similar to FIG. 9, showing a cartridge carrier of the cartridge loader.
Figure 22:
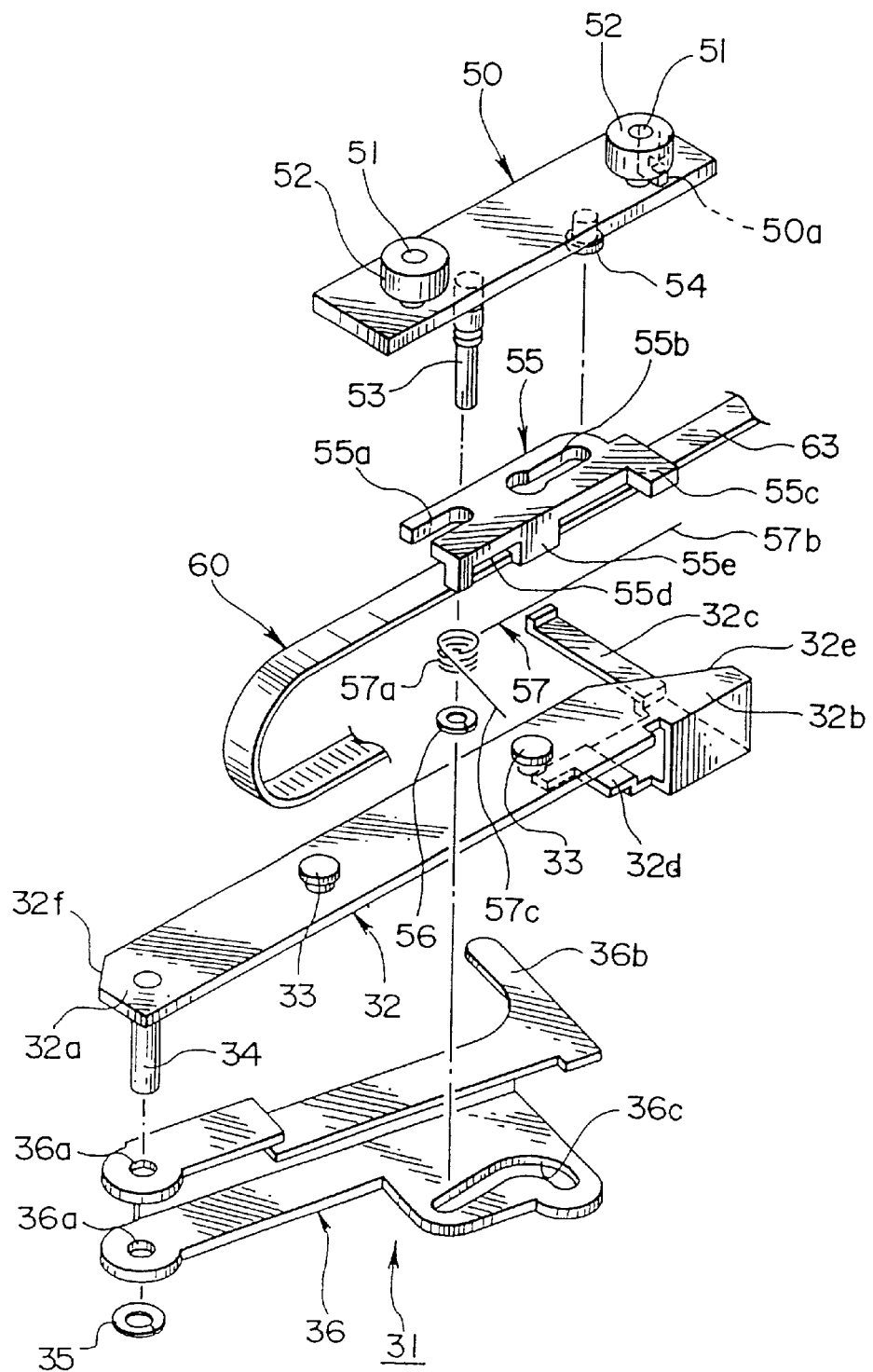
FIG. 22 is an exploded perspective view showing the cartridge carrier of the cartridge loader.

Referring to FIGS. 20–22, the cartridge carrier 31 comprises a sub slider 32 formed from a metal plate and slidably supported in the guide groove 23h of the sub holder 23 through a pair of pins 33, and a loading lever 36 swingably supported to the sub slider 32 at the base end thereof through a support shaft 34 and a snap ring 35. The sub slider 32 has an end portion 32b formed like a C-shape by an anti-detachment lug 32c and a lever stage 32d. Moreover, the sub slider 32 has a first taper 32e formed at a corner of the end 32b on the side of the disc cartridge 200 to open the shutter lever 37, and a second taper 32f formed at a corner of the base end 32a on the side of the disc cartridge 200 to close the shutter lever 37. The loading lever 36 is formed by bending a metal plate to have a C-shaped section, and has at the base end a pair of holes 36a for receiving the support shaft 36 of the sub slider 32. An upper portion of the loading lever 36 is formed at an end with the engagement 36b engaged with a recess 201c of the right side face of the disc cartridge 200, whereas a lower portion of the loading lever 36 is formed at the end with a substantially C-shaped cam groove 36c. The engagement 36b of the loading lever 36 is slidably disposed on the lever stage 32d of the sub slider 32.

As shown in FIG. 21, the shutter lever 37 is swingably supported by a support shaft 38 arranged on the lower side of the flat portion 23a of the sub holder 23. The shutter lever 37 has a bend 37a formed at the base end thereof and engaged with the front and rear tapers 32e, 32f of the sub slider 32. The shutter lever 37 has a hook 37b formed on the left of the end thereof and engaged with an opening 203b of a shutter 203 of the disc cartridge 200 for opening/closing the shutter 203. Moreover, the shutter lever 37 is formed with a round hole 37c at the end thereof. An extension coil spring 39 is interposed between the round hole 37c of the shutter lever 37 and the engagement 23i of the sub holder 23. A resilient tensile force of the extension coil spring 39 makes the shutter lever 37 to always be substantially parallel to the right side portion 23c of the sub holder 23.

As shown in FIGS. 19–20, the elevator chassis 40 is formed from a metal plate, and includes an inverted L-shaped flat portion 40a and side portions 40b, 40c obtained by bending vertically downward both ends of the flat portion 40a. The flat portion 40a of the elevator chassis 40 is formed with three round holes 40d to face the three stepped pins 29 of the sub holder 23, and with three rectangular holes 40e on the inside thereof with respect to the round holes 40d. A shank 29b of the stepped pin 29 of the sub holder 23 is arranged through the round hole 40d of the flat portion 40a so that the sub holder 23 is suspended from the flat portion 40a through a head of the stepped pin 29.

Three U-shaped ends 41a of a T-shaped plate spring 41 fixed to the flat portion 40a by caulking are arranged through the rectangular holes 40e of the flat portion 40a of the elevator chassis 40, respectively. The U-shaped ends 41a of the plate spring 41 protrude from the flat portion 40a downward to bias the flat portion 23a of the sub holder 23 downward. A resilient biasing force of the plate spring 41 and the three stepped pins 29 serve to floatably support the sub holder 23 between the side portions 40b, 40c of the elevator chassis 40. Thus, when the disc cartridge 200 is chucked between the sub holder 23 and the recording and/or reproducing part 100 as will be described later, the three bosses 23d of the flat portion 23a of the sub holder 23 are pressed to the disc cartridge 200 through a resilient biasing force of the plate spring 41.

The flat portion 40a of the elevator chassis 40 has a vertical lug 40f and a horizontal lug 40g formed in the left side portion 40b on the front and rear sides thereof. Moreover, the flat portion 40a has a rectangular guide groove 40h formed in the longer right side portion 40c to extend longitudinally, and a bend 40i formed thereto on the rear side thereof to be parallel to the right side portion 40c. The elevator chassis 40 is formed with a pair of openings 40j at the corner between the flat portion 40a and the right side portion 40c. A pair of rollers 42 of synthetic resin is rotatably supported through support shafts 42a to the left side portion 40b of the elevator chassis 40 substantially in the center of the outer side thereof, whereas a pair of rollers 43 of synthetic resin is rotatably supported through support shafts 43a to the right side portion 40c of the elevator chassis 40 on the outer side thereof to face the pair of rollers 42. A pair of metal brackets 44A, 44B having an inverted L-shaped section is screwed to the outer side of the right side portion 40c of the elevator chassis 40 to face the pair of openings 40j. A metallic plate-like bracket 45 is fixed to the outer side of the right side portion 40c by caulking between the roller 43 and the front bracket 44A. Detection switches 46A, 46B are mounted on the brackets 44A, 44B to be exposed from the openings 40j.

Arranged on the flat portion 40a of the elevator chassis 40 in the front thereof is a pair of stepped pins 47 through which a pair of guide grooves 48a of a metallic lock removing slider 48 is arranged. Thus, the lock removing slider 48 is horizontally slidably supported through the pair of stepped pins 47. The lock removing slider 48 is formed with an engagement 48b at the left end thereof, and with a pair of tapers 48c, 48d in the front and rear of the T-shaped portion of the right end thereof. As shown in FIG. 18, the engagement 48b of the lock removing slider 48 is arranged through the recess 24c of the lock lever 24 of the left main holder 22L. An extension coil spring 49 is interposed between a lug 48e of the lock removing slider 48 arranged on the front side thereof and a bend 45a of the bracket 45 fixed to the right side portion 40c of the elevator chassis 40. Thus, the lock removing slider 48 is always biased to the right side portion 40c of the elevator chassis 40.

Referring to FIGS. 19–22, the loading slider 50 for horizontally reciprocating the cartridge carrier 31 of the cartridge loader 30 is formed from a metal plate to have a rectangular shape. A pair of metallic rollers 52 is rotatably supported to the loading slider 50 in the front and rear of the upper side thereof through support shafts 51. The support shafts 51 are arranged from below through the guide groove 40h of the flat portion 40a of the elevator chassis 40 so that the loading slider 50 is longitudinally slidably supported in the guide groove 40h of the elevator chassis 40 through the rollers 52. Upon slide operation, the rollers 52 abut on or separate from the tapers 48c, 48d of the lock removing slider 48 arranged at the right end thereof. A long bar-like shaft 53 and a short pin-like shaft 54 are arranged on the lower side of the loading slider 50 in the front and rear thereof. The lower side of the loading slider 50 is disposed on a connecting plate 55 of synthetic resin and connected to a timing belt 63 of the first drive 60 as will be described later.

As shown in FIG. 22, the connecting plate 55 has an U-shaped recess 55a formed at the base end in the left portion thereof, and a groove 55b extending from the center to the end in the left portion thereof. Moreover, the connecting plate 55 has a switch operation part 55c formed on the right of the end thereof to abut on a switch part of the detection switches 46A, 46B, and a recess 55d formed in the lower portion of the base end of the right side face thereof. The bar-like shaft 53 of the loading slider 50 is arranged through the recess 55a of the connecting plate 55, and it is further arranged through the cam groove 36c of the loading lever 36 so as not to come out therefrom through a stop ring 56. The pin-like shaft 54 of the loading slider 50 is arranged through a large-diameter portion of the groove 55b of the connecting plate 55, and is slidably engaged with a small-diameter portion of the groove 55b. A coil 57a of a torsion coil spring 57 is inserted in the bar-like shaft 53 in the upper portion thereof. The torsion coil spring 57 has one end 57b engaged with a hook 50a of the loading slider 50, and another end engaged with the recess 55d of the connecting plate 55. A biasing force of the torsion coil spring 57 makes the loading slider 50 to always be biased to the end of the connecting plate 55.

As shown in FIGS. 9, 13, and 19, the first drive 60 for horizontally reciprocating the loading slider 50 comprises a pair of gears 62 rotatably supported to the right side portion 40c of the elevator chassis 40 in the front and rear of the inner side thereof through support shafts 61, an annulus timing belt 63 for interconnecting pulleys 62a integrated with the gears 62, a motor 64 mounted to the rear bracket 44B arranged in the right side portion 40c of the elevator chassis 40, a worm 65 connected to a rotation shaft 64a of the motor 64, and an intermediate gear 67 rotatably supported through a support shaft 66 to the elevator chassis 40 between the bend 40i and the bracket 44B and including a worm gear 67a engaged with the worm 65 and a small-diameter gear 67b engaged with the rear gear 62.

As shown in FIG. 22, the connecting plate 55 is fixed to the timing belt 63 in the middle thereof through a C-shaped connection 55e. The connecting plate 55 and the timing belt 63 allow the loading slider 50 to horizontally reciprocate along the guide groove 40h of the elevator chassis 40. The initial position (position before movement) of the loading slider 50 is detected when the switch operation part 55c of the connecting plate 55 presses the switch part of the front detection switch 46A arranged in the right side portion 40c of the elevator chassis 40, whereas the final position (position after movement) of the loading slider 50 is detected when the switch operation part 55c presses the switch part of the rear detection switch 46B arranged in the right side portion 40c of the elevator chassis 40. Detection signals of the detection switches 46A, 46B are provided to a controller, not shown, to control driving of the motor 64. As shown in FIG. 13, a stopper 68 is arranged to the pulley 62a of the gear 62 to prevent the timing belt 63 from coming out therefrom.

As shown in FIGS. 9, 13, and 19, the second drive 70 for vertically moving the elevator chassis 40 comprises a pair of racks 71, 72 vertically screwed to the lower chassis 18 at both sides thereof and including vertical guide grooves 71b, 72b for guiding the pairs of rollers 42, 43 arranged in the side portions 40b, 40c of the elevator chassis 40, a motor 73 mounted to the front bracket 44A arranged in the right side portion 40c of the elevator chassis 40, a worm 74 connected to a rotation shaft 73a of the motor 73, a first intermediate gear 76 rotatably supported through a support shaft 75 to the elevator chassis 40 between the right side portion 40c and the bracket 44A and including a worm gear 76a engaged with the worm 74 and a small-diameter gear 76b, a second intermediate gear 78 rotatably supported through a support shaft 77 to the bracket 45 fixed to the right side portion 40c of the elevator chassis 40 and including a large-diameter gear 78a engaged with the small-diameter gear 76b of the first intermediate gear 76 and a small-diameter gear 78b, a shaft 79 rotatably supported by the vertical lug 40f and the bracket 45 arranged in the left side portion 40b of the elevator chassis 40, and a pair of drive gears 80, 81 fixed to the shaft 79 at both ends thereof and including small-diameter gears 80b, 81b engaged with gears 71a, 72a of the racks 71, 72 and large-diameter gears 80a, 81a.

The racks 71, 72 are made of synthetic resin to have substantially a rectangular-parallelpiped-like shape, and are formed in the front with the gears 71a, 72a engaged with the small-diameter gears 80b, 81b of the drive gears 80, 81. The racks 71, 72 have vertical guide grooves 71b, 72b having an U-shaped section formed in the center of the inner side thereof to extend vertically, and pairs of ribs 71c, 72c formed in the center of the outer side thereof. Moreover, the racks 71, 72 have protrusions 71d, 72d formed with the lower side thereof and screwed to the lower chassis 18, and pairs of pins 71e, 72e formed on the upper side thereof. The pins 71e, 72e of the racks 71, 72 are engaged with holes, not shown, of the upper chassis 19, respectively. Thus, the racks 71, 72 are vertically fixed to the upper and lower chassis 18, 19 to be parallel to each other. As shown in FIGS. 9 and 19, the right rack 72 has six slits 72f equidistantly formed in the rear thereof.

Referring to FIGS. 9, 13, and 19, the large-diameter gear 81a of the right drive gear 81 is engaged with the small-diameter gear 78b of the second intermediate gear 78. Thus, a driving force of the motor 73 is transmitted to the drive gears 80, 81 through the intermediate gears 76, 78, which enables the elevator chassis 40 holding the sub holder 23 of the cartridge holder 21 through the racks 71, 72 to be moved vertically and stopped with respect to the holder portions 22b of the main holders 22L, 22R of the cartridge holder 21.

Figure 11:
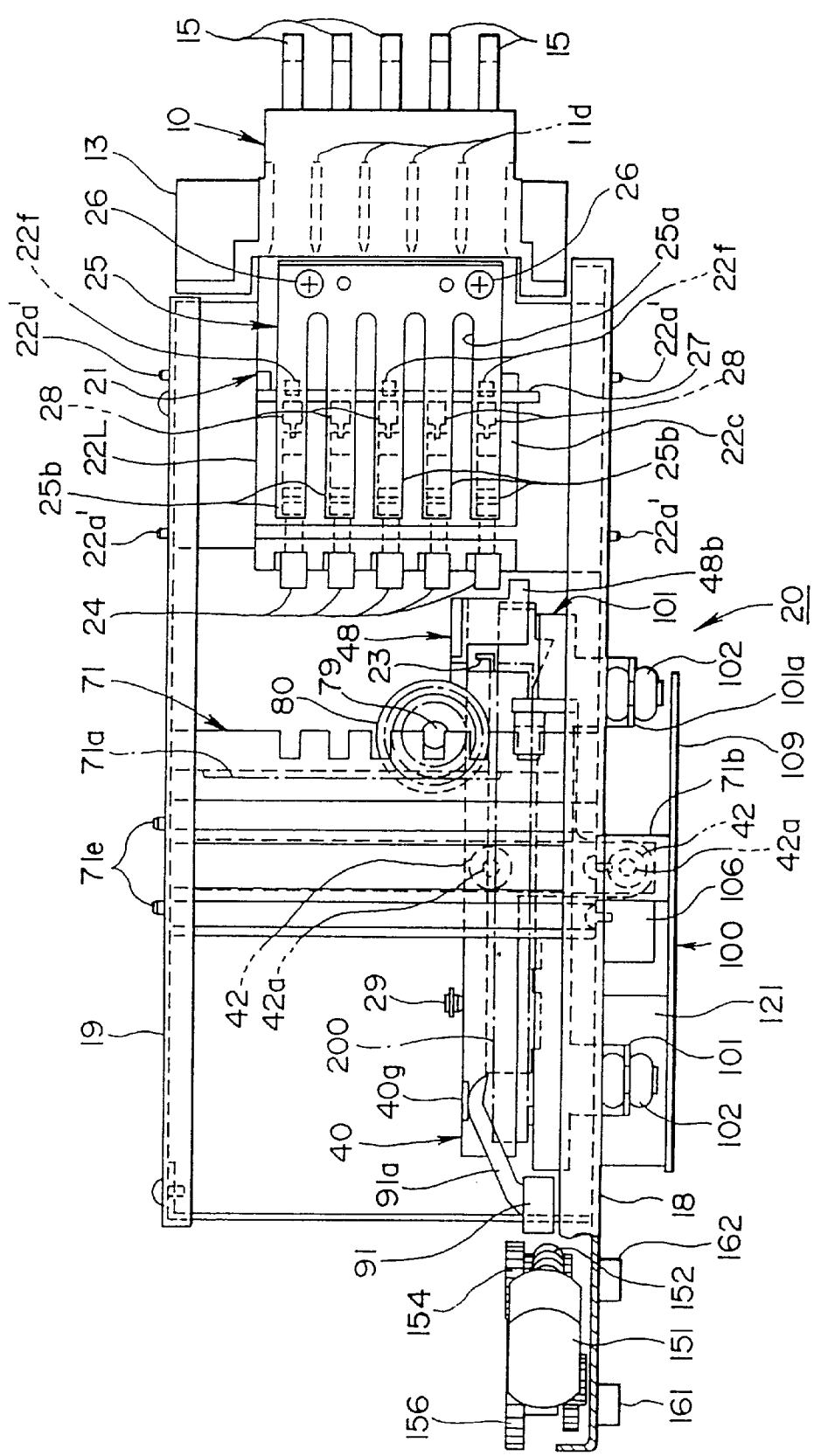
FIG. 11 is a left side view showing the cartridge changer.

As shown in FIGS. 9 and 19, an optical sensor 90 is mounted to the right side portion 40c of the elevator chassis 40 in the rear thereof to face the rear of the right rack 72 arranged in the upper portion of the bracket 44B. The optical sensor 90 is formed like a C-shape, and includes a light emitter and a light receiver, not shown, which are arranged opposite to each other across the slits 72f of the right rack 72. As shown in FIGS. 11 and 13, a detection switch 91 is mounted through a base plate, not shown, on the lower chassis 18 which faces the horizontal lug 40g arranged in the left side portion 40b of the elevator chassis 40. A switch part 91a of the detection switch 91 can be turned on and off by the horizontal lug 40g of the left side portion 40b of the elevator chassis 40. The vertical movement and stop position of the cartridge holder 21 of the elevator chassis 40 with respect to the holder portions 22b of the main holders 22L, 22R are detected by the slits 72f of the right rack 72 and the optical sensor 90. A detection signal of the optical sensor 90 is provided to the controller to control driving of the motor 73 of the second drive 70. The stop position of downward movement of the elevator chassis 40 is detected by the detection switch 91 which provides a detection signal to control driving a motor 151, etc. of a head mover 150.

Figure 14:
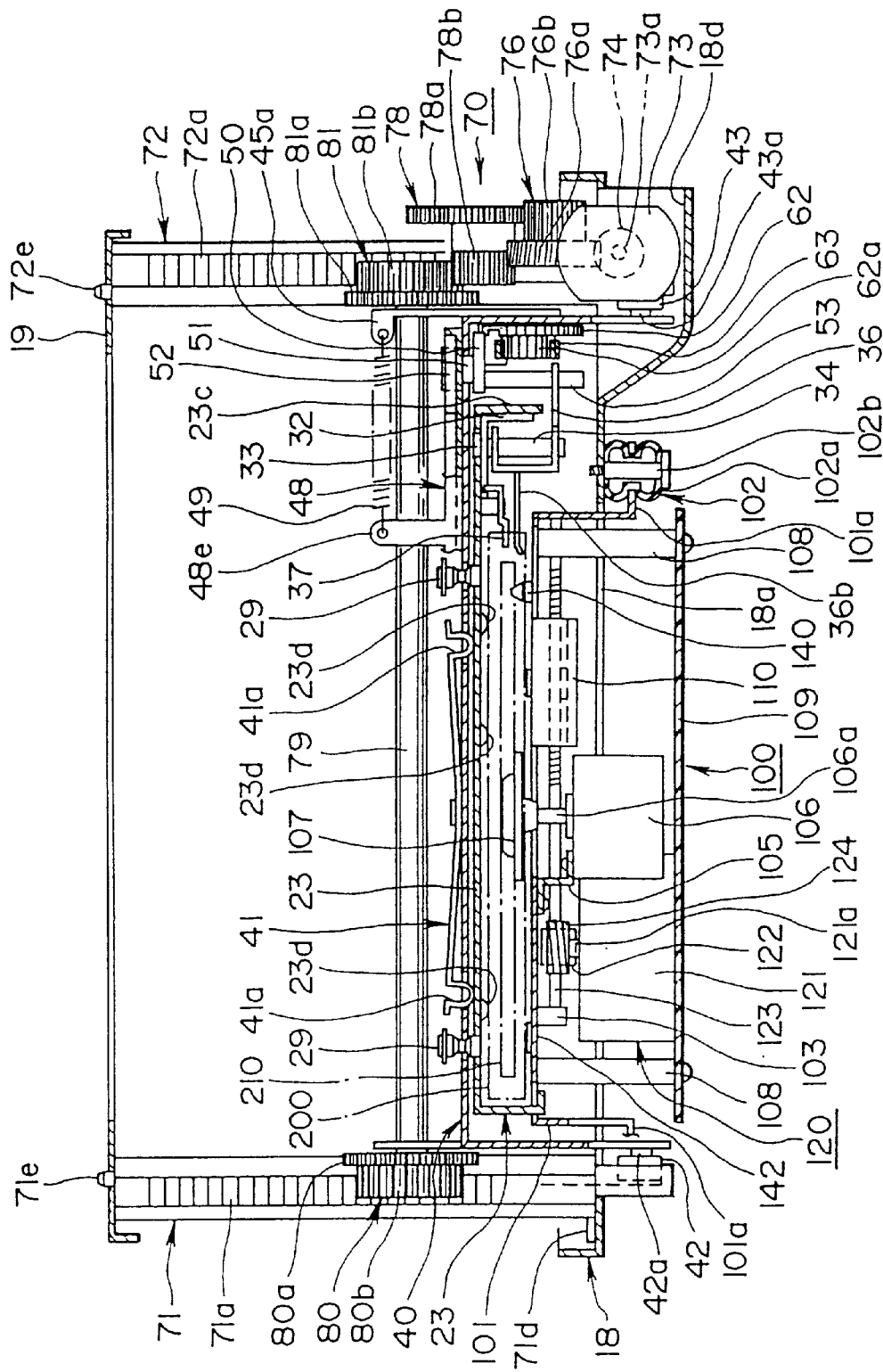
FIG. 14 is a longitudinal section as viewed from the front, showing the cartridge changer.
Figure 15:
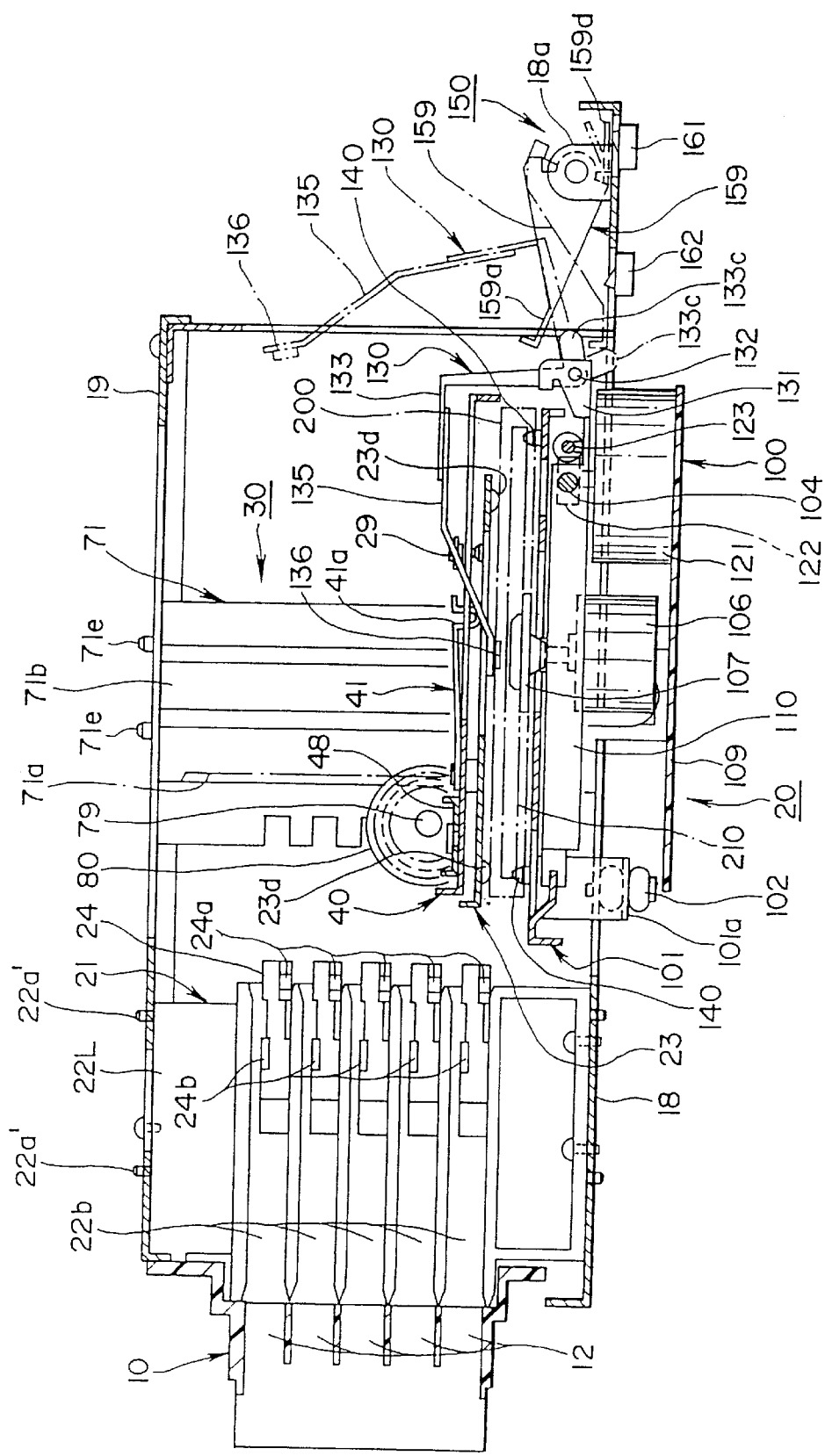
FIG. 15 is a cross section as viewed from the right side, showing the cartridge changer.
Figure 16:
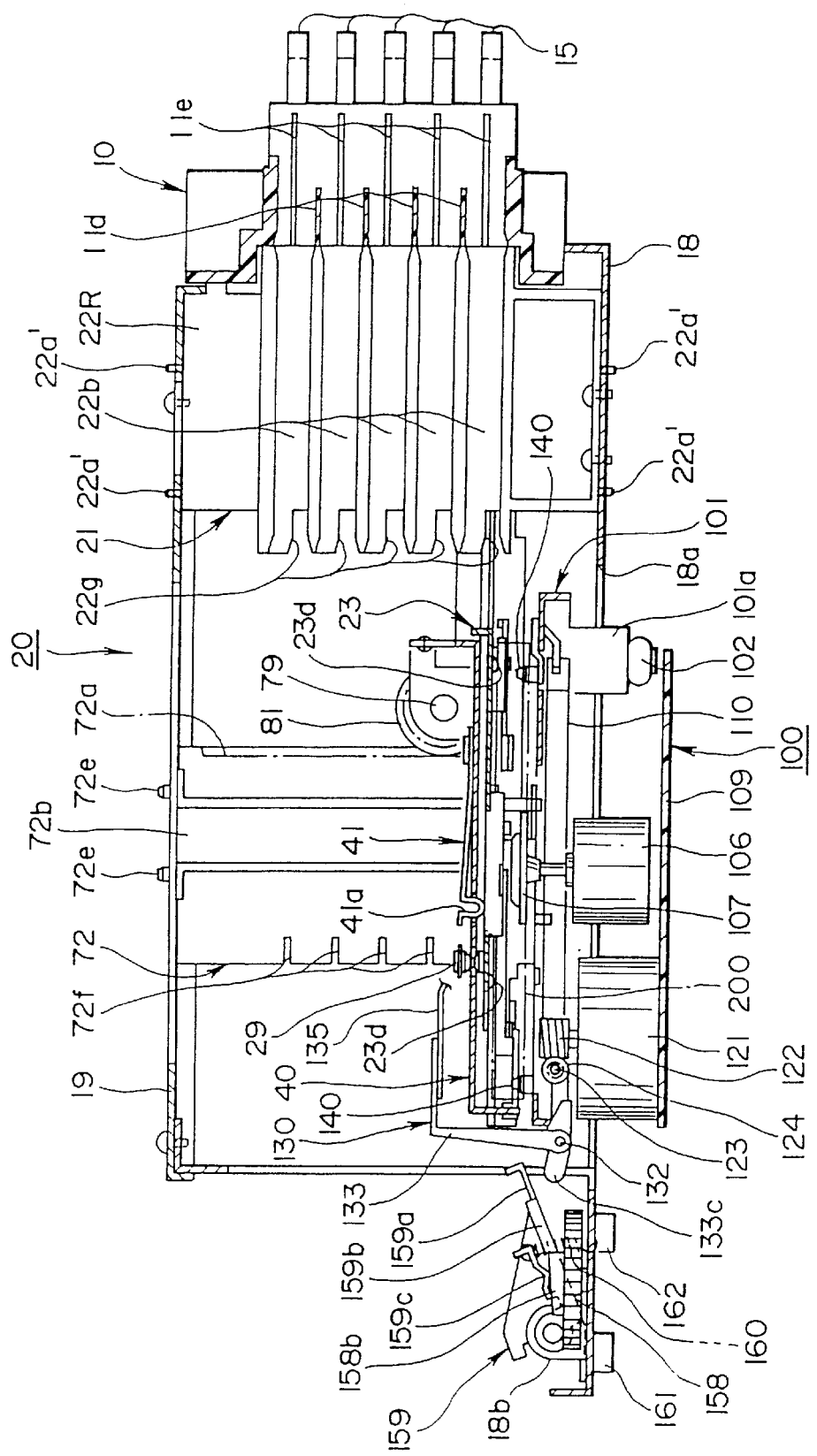
FIG. 16 is a view similar to FIG. 15 as viewed from the left side, showing the cartridge changer.
Figure 17:
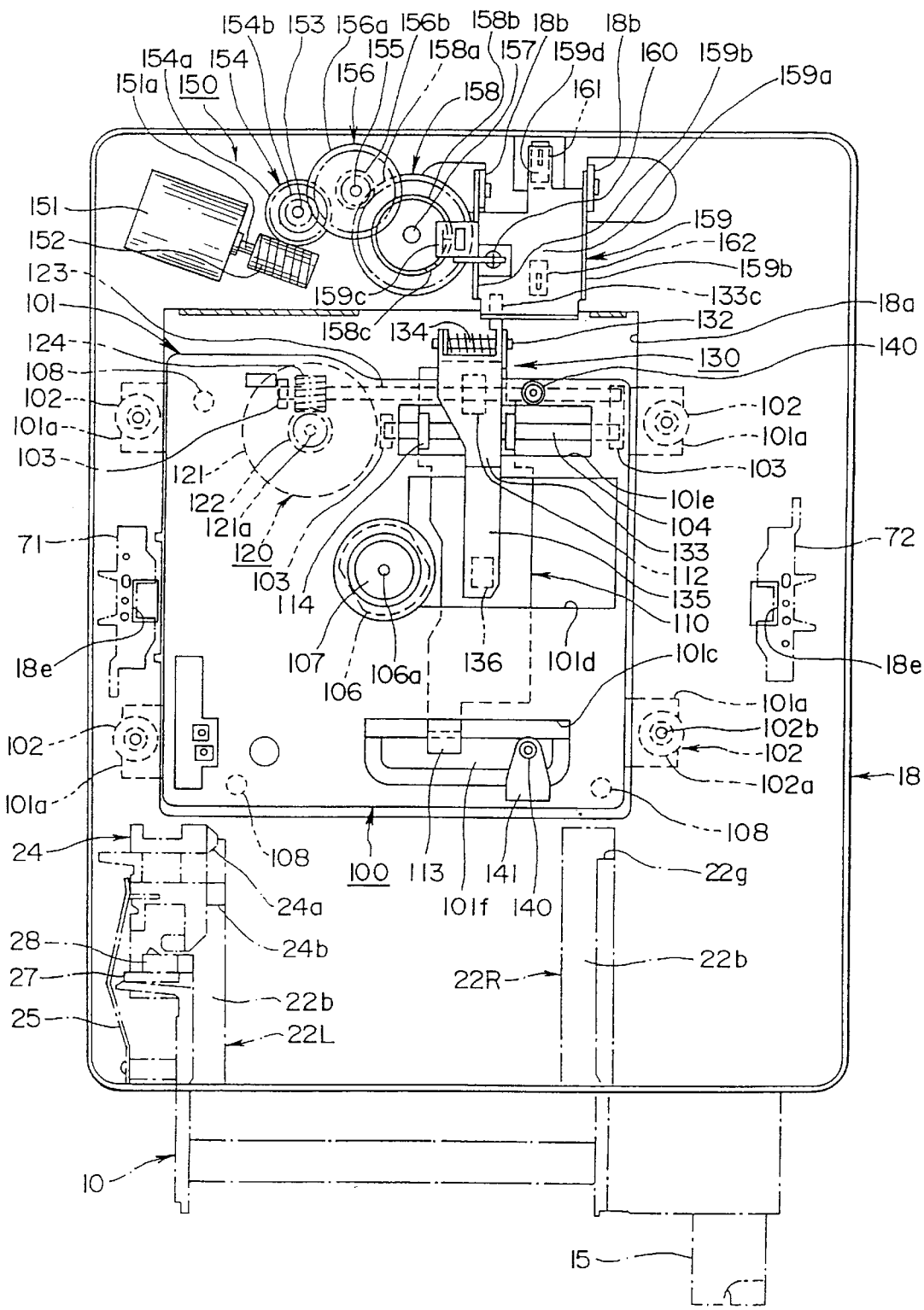
FIG. 17 is a view similar to FIG. 13, showing a lower chassis of the cartridge changer.

As shown in FIGS. 14 and 17, the lower chassis 18 is formed with a rectangular opening 18a substantially in the center thereof, in which the recording and/or reproducing part 100 and the recording head 130 are disposed to record and/or reproduce information on the magneto-optical disc 210 of the disc cartridge 200. The head mover 150 is disposed on the lower chassis 18 in the rear of the opening 18a to move the recording head 130 from a vertical locus of the cartridge carrier 31 of the cartridge loader 30, i.e. a vertical locus of the elevator chassis 40.

Figure 23:
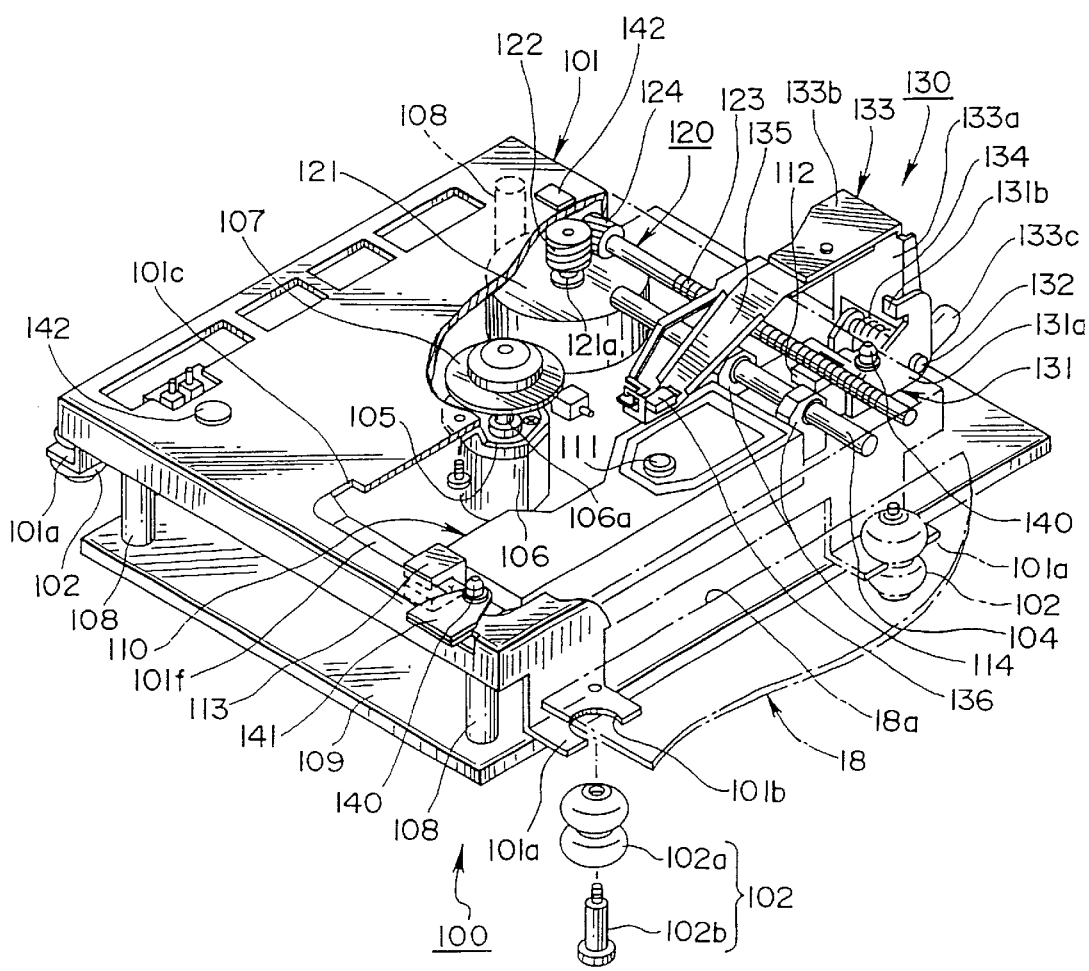
FIG. 23 is a view similar to FIG. 21, showing a recording and/or reproducing part of the cartridge changer.

Referring to FIGS. 14, 17, and 23, the recording and/or reproducing part 100 includes a substantially box-like metallic chassis 101 having an opening in the lower side thereof. A pair of L-shaped flanges 101a is integrated with the part chassis 101 at both sides thereof. The flanges 101a are supported to the lower chassis 18 in the opening 18a through dampers 102, which allows the recording and/or reproducing part 100 to floatably be supported in the opening 18a of the lower chassis 18. Each damper 102 comprises a hollow rubber cushion 102a having a contracted center portion engaged with a circular recess 101b of the flange 101a, and a long pin-like screw 102b for mounting the cushion 102a to the lower chassis 18 at a predetermined position about the opening 18a. The flange 101a is moved along a shank of the screw 102b through the cushion 102a of the damper 102, so that the recording and/or reproducing part 100 is floatably supported with respect to the lower chassis 18.

As shown in FIG. 17, the part chassis 101 is formed with substantially rectangular openings 101c, 101d, 101e in the front, center, and rear of the right portion thereof. A guide lug 101f is arranged to the part chassis 101 in front of the front opening 101c to protrude downward and have a parallel bend, whereas a metallic guide shaft 104 is mounted to the part chassis 101 below the rear opening 101e through mounting plates 103 of synthetic resin. An optical pickup 110 is supported by the guide lug 101f and the guide shaft 104 to be reciprocable horizontally or in the radial direction of the magneto-optical disc 210. As shown in FIGS. 14 and 17, a spindle motor 106 is screwed through a metallic mounting plate 105 to the part chassis 101 on the left of the center opening 101d or substantially in the center thereof. A turntable 107 is fixed to a rotation shaft 106a of the spindle motor 106 in the upper portion thereof to protrude upward from the left portion of the center opening 101d of the part chassis 101.

As shown in FIGS. 14 and 23, a base plate 109 is mounted to the part chassis 101 on the lower side thereof through three cylinders 108 of synthetic resin and fixed to the lower side of the part chassis 101 by outsert forming, etc. A pickup drive 120 is interposed between the base plate 109 and the part chassis 101 to reciprocate the optical pickup 110. The pickup drive 120 comprises a motor 121 fixed on the base plate 109, a worm 122 fixed to the rotation shaft 121a of the motor 121, a screw bolt 123 rotatably supported to the mounting plates 103 fixed to the lower side of the part chassis 101, and a worm gear 124 fixed to one end of the screw bolt 123 and engaged with the worm 122. The screw bolt 123 is engaged with a substantially V-shaped gear 112 fixed on the optical pickup 110 in the rear thereof, so that the optical pickup 110 is horizontally reciprocated with respect to the part chassis 101 by driving of the motor 121.

As shown in FIG. 23, the recording head 130 for recording information on the magneto-optical disc 210 is arranged to extend from the lower side of the optical pickup 110 to an objective lens 111. The recording head 130 comprises a metallic head connecting plate 131 screwed to the lower side of the optical pickup 110 at the base end thereof, a support shaft 132 interposed between a pair of lugs 131a of the head connecting plate 131 in the rear thereof, a metallic L-shaped head mounting plate 133 longitudinally swingably supported to the support shaft 132 at both sides thereof, a torsion coil spring 134 wound on the support shaft 132 and having one end engaged with the head mounting plate 133 to always bias it in the direction of falling forward (refer hereafter the direction of falling forward to as "down direction", and the direction of standing upright to as "up direction"), a substantially L-shaped gimbals 135 fixed to the head mounting plate 133, and magnetic head 136 fixed to the gimbals 135 at an end thereof to face the objective lens 111 of the optical pickup 110 in the down state of the head mounting plate 133 and for providing a vertical magnetic field modulated in accordance with a signal to be recorded on the magneto-optical disc 210. The rear of one of the lugs 131 of the head connecting plate 131 extends upward to form an L-shaped stopper 131b. A body 133a of the head mounting plate 133 abuts on the stopper 131b to maintain and restrain the down state of the head mounting plate 133. The mounting plate 133 is formed like an L-shape by the body 133a and an end 133b, and includes an operation lug 133c arranged to the body 133a at the lower end thereof to be substantially perpendicular thereto.

As shown in FIG. 23, a pair of positioning pins 140 is arranged to the part chassis 101 at the right corners thereof. The front positioning pin 140 is arranged on the part chassis 101 through a metallic mounting plate 141. A pair of position reference seals 142 is placed on the part chassis 101 at the left corners. When the elevator chassis 40 is moved downward to chuck the disc cartridge 200 between the sub holder 23 and the part chassis 101 of the recording and/or reproducing part 100, the sub holder 23 and the recording and/or reproducing part 100 are separable from the lower chassis 18 and the elevator chassis 40, so that as shown in FIG. 14, the disc cartridge 200 is correctly positioned among the positioning pins 140, the position reference seals 142, and the three bosses 23d of the flat portion 23a of the sub holder 23.

Figure 24:
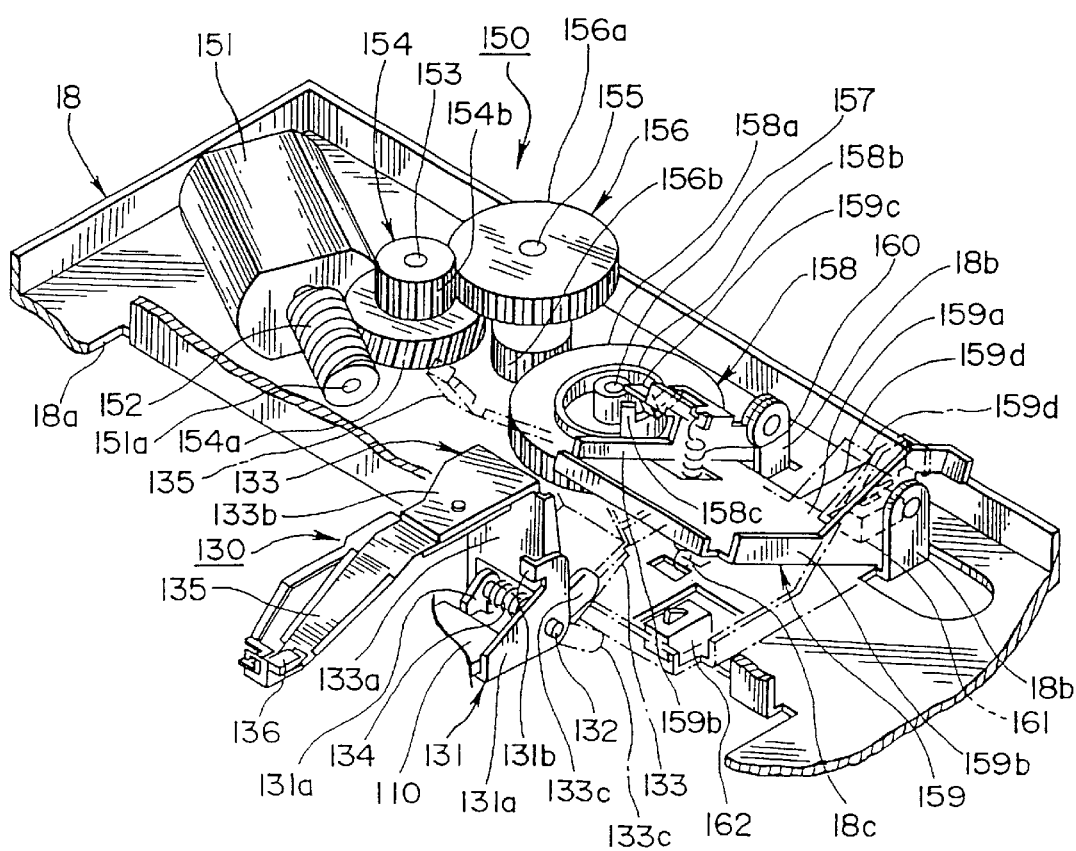
FIG. 24 is a view similar to FIG. 2, showing a head mover of the cartridge changer.

Referring to FIGS. 17 and 24, the head mover 150 for moving the magnetic head 136 of the recording head 130 from a vertical locus of the elevator chassis 40 comprises a motor 151 mounted on the lower chassis 18 in the rear thereof, a worm 152 connected to a rotation shaft 151a of the motor 151, a third intermediate gear 154 rotatably supported on the lower chassis 18 through a support shaft 153 arranged in the rear thereof and including a worm gear 154a engaged with the worm 152 and a small-diameter gear 154b, a fourth intermediate gear 158 rotatably supported on the lower chassis 18 through a support shaft 155 arranged in the rear thereof and including a large-diameter gear 156a engaged with the small-diameter gear 154b of the third intermediate gear 154 and a small-diameter gear 156b, a cam gear 158 rotatably supported on the lower chassis 18 through a support shaft 157 arranged in the rear thereof and including a large-diameter gear 158a engaged with the small-diameter gear 156b of the fourth intermediate gear 156 and a taper 158b protruding from the upper side of the lower chassis 18 as a spiral rib, a lever 159 longitudinally swingably supported by a pair of vertical supports 18b arranged in the rear of n the lower chassis 18 and including a protrusion 159c disposed on the taper 158b, and an extension coil spring 160 interposed between the rear of the protrusion 159c of the lever 159 and an engagement 18c of the rear of the lower chassis 18 and for always biasing the lever 159 downward.

The cam gear 158 is made of synthetic resin such that the spiral-rib-like taper 158b has the top formed with a stopper 158c. The cam gear 158 can be rotated until the stopper 158c abuts on the protrusion 159c of the lever 159. The lever 159 includes a flat portion 159a and a pair of side portions 159b obtained by bending both ends of the flat portion 159a upward to have a C-shaped section, the protrusion 159c being integrated with the left side portion 159b. The lever 159 has a rectangular protrusion 159d integrated with the rear of the flat portion 159a.

When the protrusion 159c of the lever 159 is positioned on the side of the top of the taper 158b of the cam gear 158, the operation lug 133c of the head mounting plate 133 of the recording head 130 is separated from an end of the flat portion 159a of the lever 159. At that time, the head mounting plate 133 of the recording head 130 is in the down state as indicated by fully-drawn lines in FIG. 24, which is detected by the rear protrusion 159d of the lever 159 abutting on the first detection switch 161 mounted on the lower chassis 18. Thus, when the recording information on the magneto-optical disc 210 of the disc cartridge 200 through the recording and/or reproducing part 100 and the recording head 130, the head mover 150 moves the magnetic head 136 of the recording head 130 to the recording position of the magneto-optical disc 210. When the protrusion 159c of the lever 159 is positioned on the side of the bottom of the taper 158b of the cam gear 158, the operation lug 133c of the head mounting plate 133 of the recording head 130 is depressed by the end of the flat portion 159a of the lever 159 against a resilient force of the torsion coil spring 134. At that time, the head mounting plate 133 of the recording head 130 is in the up state as indicated by one-dot chain lines in FIG. 24, which is detected by the end of the flat portion 159a of the lever 159 abutting on the second detection switch 162 mounted on the lower chassis 18. Detection signals of the detection switches 161, 162 are provided to the controller to control driving of the motor 151.

Referring to FIGS. 9, 13, 25, and 35, the main body 201 of the disc cartridge 200 includes upper and lower half portions of synthetic resin to have a flat-box-like shape, in which the magneto-optical disc 210 is rotatably accommodated. A hub 211 is fixed to the magneto-optical disc 210 in the center thereof. When chucking the disc cartridge 200 between the recording and/or reproducing part 100 and the sub holder 107, the hub 211 is magnetically attracted to the turntable 107.

Figure 25:
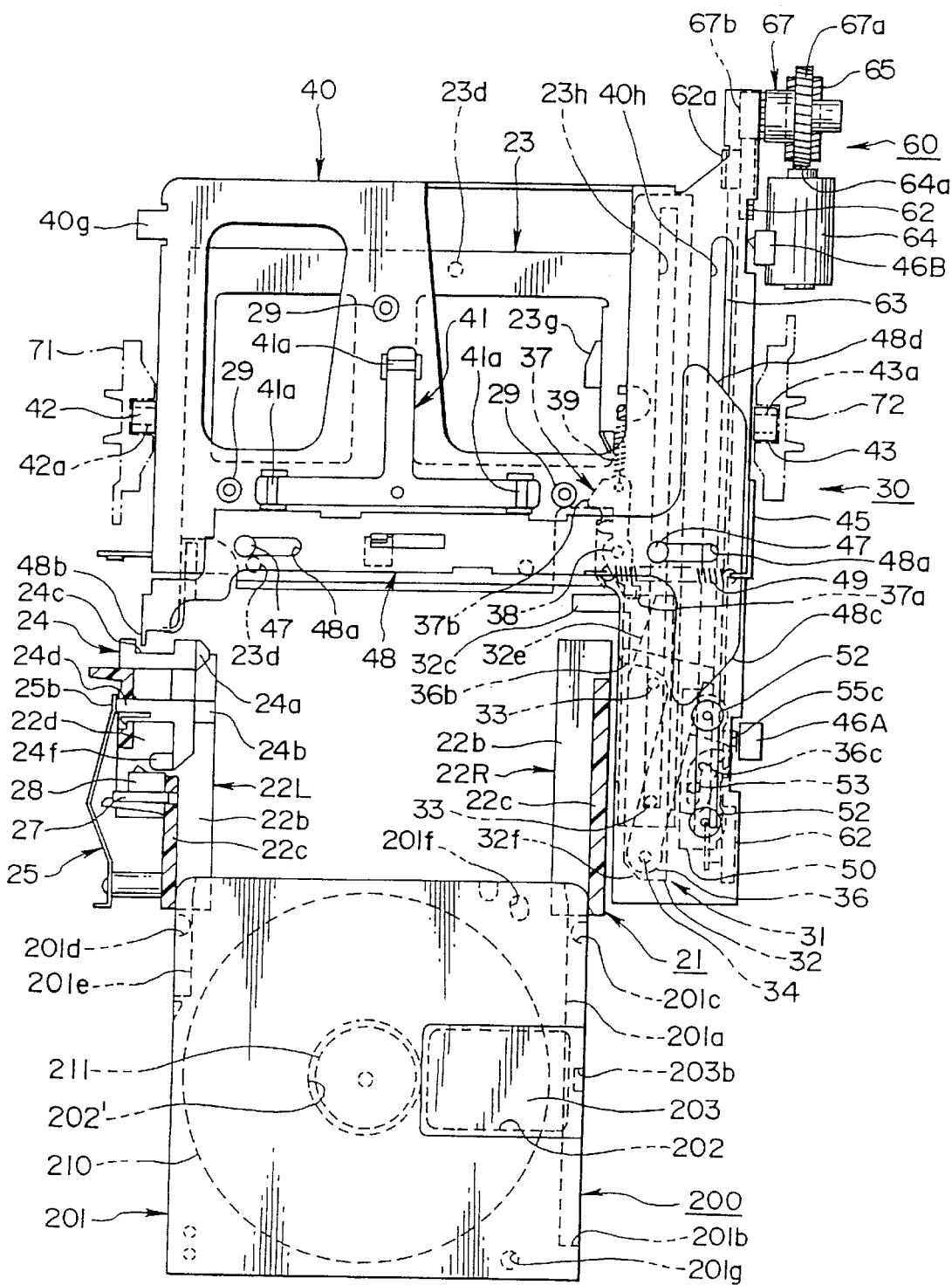
FIG. 25 is an explanatory view showing the disc cartridge being inserted between main holders of a cartridge holder of the cartridge changer.

As shown in FIGS. 13 and 25, the cartridge main body 201 is formed with facing rectangular openings 202 in the center of the right portions of the upper and lower sides thereof, and a round hub hole 202' in the center of the lower side thereof (only seen in FIG. 25). The hub 211 of the magneto-optical disc 210 is exposed from the hub hole 202'. Moreover, the cartridge main body 201 is formed with a long slit-like slide groove 201a in the center of the right side face thereof, and a recess 201c in the lower portion of the front of the right side face thereof to be engaged with the engagement 36b of the loading lever 36. The shutter 203 is slidable along the slide groove 201a of the cartridge main body 201 up to an end 201b thereof. The shutter 203 for opening/closing the opening 202 of the cartridge main body 201 is made of metal to have a C-shaped section, and is formed with an engagement 203a in the center of the front thereof as shown in FIG. 21, with which a claw 204a of a substantially V-shaped lock lever 204 of synthetic resin arranged in the cartridge main body 201 is engaged. Engagement of the engagement 203a of the shutter 203 with the claw 204a of the lock lever 204 is removed when the support 23g of the sub holder 23 slides in the slide groove 201a. The shutter 203 is formed with a rectangular hole 203b in the center of the right side face thereof to be engaged with the hook 37b of the shutter lever 37.

Referring to FIGS. 9 and 25, the cartridge main body 201 is formed with a lock recess 201d in the lower portion of the front of the left side face thereof to be engaged with the first protrusion 24a of the lock lever 24, and a short slide groove 201e in the center thereof to receive the second protrusion 24b of the lock lever 24. When the cartridge loader 30 transfers the disc cartridge 200 from the left main holder 22L to the sub holder 23, locking of the first protrusion 24a of the lock lever 24 and the lock recess 201d of the left side face of the cartridge main body 201 is removed by the engagement 48b of the lock removing slider 48 making the lock lever 24 slide leftward through the recess 24c of the lock lever 24. The cartridge main body 201 is formed with a pair of positioning holes 201f, 201g in the right portion of the lower side, into which the pair of positioning pins 140 of the recording and/or reproducing part 100 is inserted to ensure positioning of the disc cartridge 200 in terms of a plane. As shown in FIG. 9, an error-erasing protector 205 is slidably arranged to the cartridge main body 201 in the rear thereof, which allows in accordance with the position thereof a detector, not shown, to detect whether or not information on the magneto-optical disc 210 can be written.

As shown in FIGS. 9 and 12, the lower chassis 18 of the device main body 2 is formed with a pair of protrusions 18d to face the motor 64 of the first drive 60 and the motor 74 of the second drive 70. Moreover, as shown in FIG. 17, the lower chassis 18 is formed with a pair of rectangular holes 18e to face the vertical guide grooves 71b, 72b of the racks 71, 72. Referring to FIGS. 11–12, the vertical guide grooves 71b, 72b of the racks 71, 72 are arranged through the holes 18e of the lower chassis 18 to protrude downward from the lower side thereof. As shown in FIGS. 17 and 23, the optical pickup 110 has at one end a C-shaped receiver 113 slidably supported to the guide lug 101f of the part chassis 101, and at another end a pair of bearings 114 slidably supported to the guide shaft 104.

Figure 26:
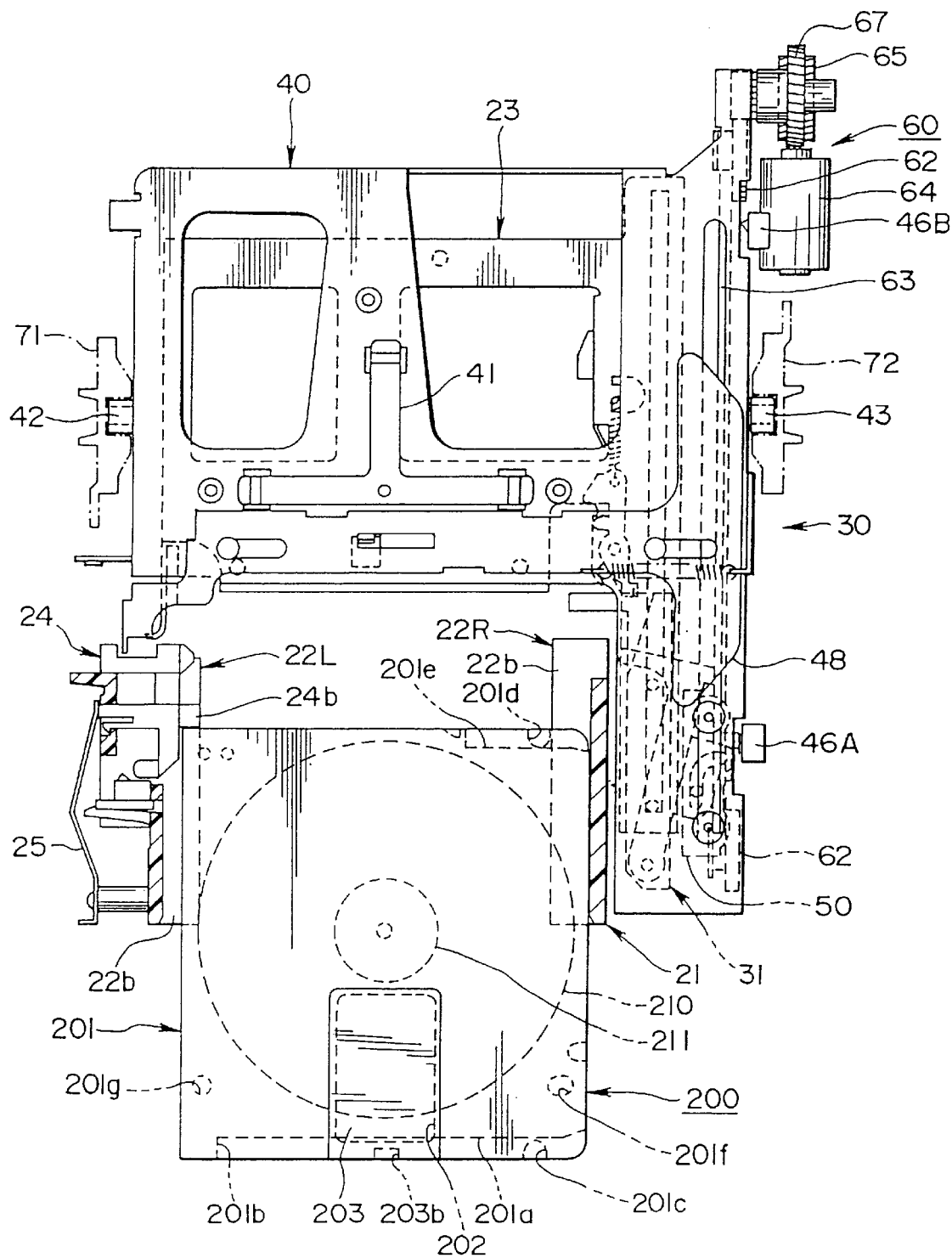
FIG. 26 is a view similar to FIG. 25, showing the disc cartridge having erroneously been inserted between the main holders of the cartridge holder.
Figure 27A:
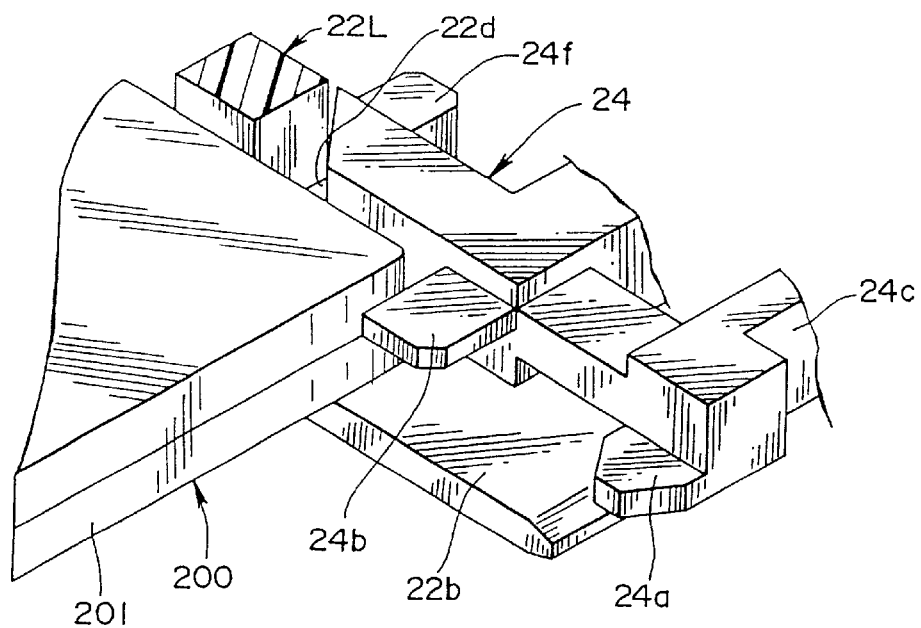
FIG. 27A is a view similar to FIG. 8, showing the relationship between the lock lever and the disc cartridge when the disc cartridge is erroneously inserted in terms of the direction of insertion.
Figure 27B:
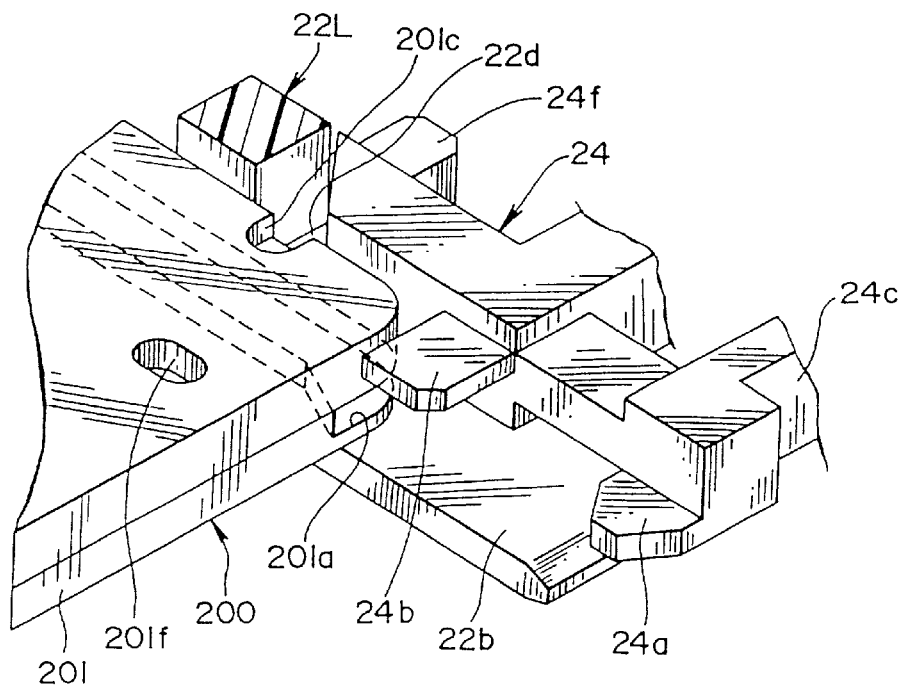
FIG. 27B is a view similar to FIG. 27A, showing the relationship between the lock lever and the disc cartridge when the disc cartridge is inserted face down.

With the disc recording and/or reproducing device 1 with the cartridge changer 20 embodying the present invention, when inserting the disc cartridge 200 into the opening 12 by opening the cover 4 of the front panel of the device main body 2 as shown in FIG. 2, the disc cartridge 200 is received between the holder portions 22b of the main holders 22L, 22R of the cartridge holder 21 as shown in FIG. 25. If the disc cartridge 200 is inserted erroneously in terms of the direction of insertion, i.e. from the left side face of the cartridge main body 201 as shown in FIG. 26, the left side face of the disc cartridge 200 abuts, as shown in FIGS. 26–27A, on the second protrusion 24b of the lock lever 24 biased rightward by the plate spring 25 as viewed in FIG. 26, which disallows loading of the disc cartridge 200 between the main holders 22L, 22R. If the disc cartridge 200 is inserted face down as shown in FIG. 27B, it cannot be loaded between the main holders 22L, 22R due to the height difference between the second protrusion 24b of the lock lever 24 and the slide groove 201a of the disc cartridge 200. This enables easy and sure prevention of error insertion of the disc cartridge 200 between the holder portions 22b of the main holders 22L, 22R. The fact that the disc cartridge 200 is not erroneously loaded between the holder portions 22b of the main holders 22L, 22R contributes to elimination of breakdown factors of the cartridge loader 30, etc.

Figure 28:
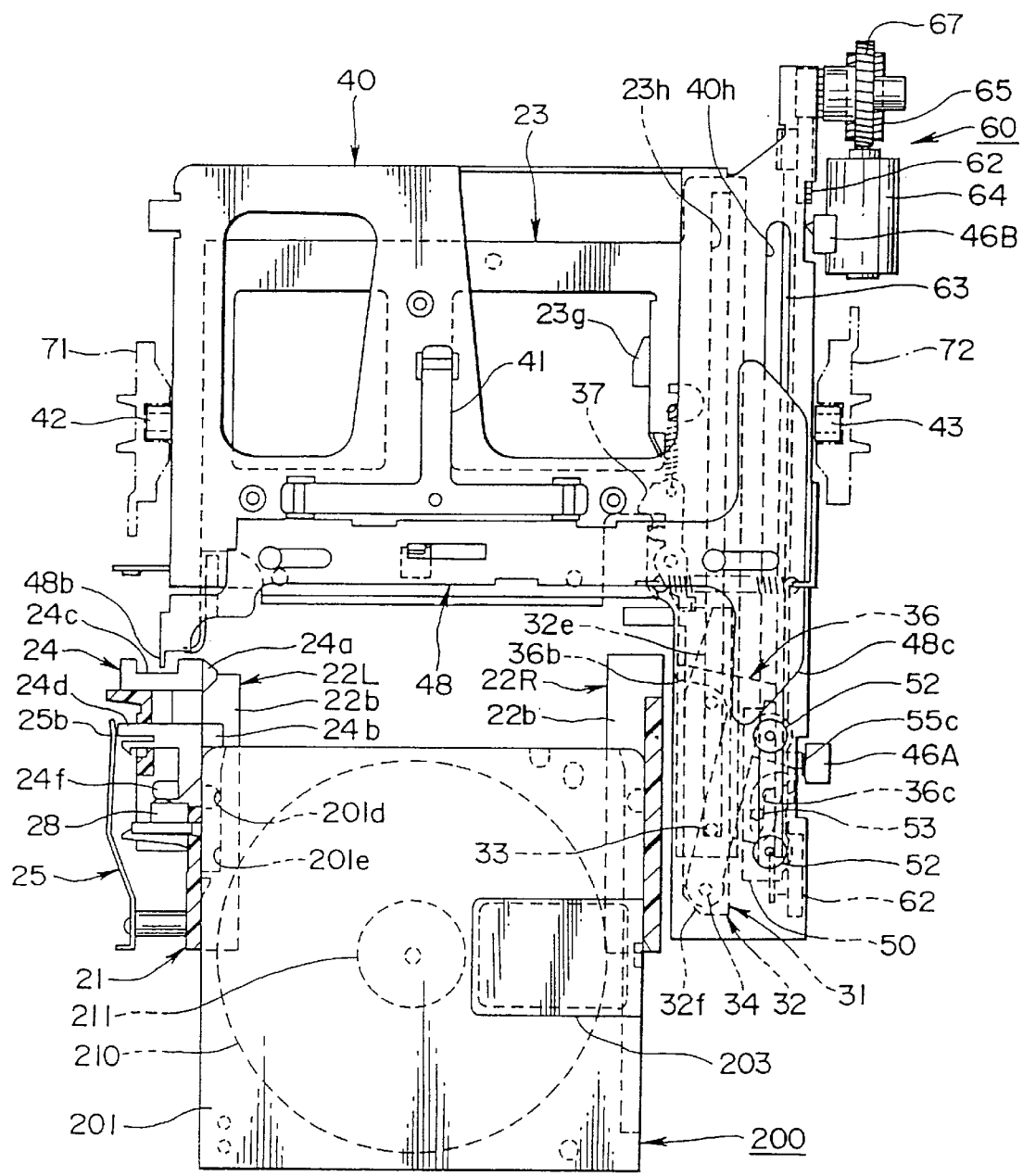
FIG. 28 is a view similar to FIG. 26, showing a second protrusion of the lock lever being about to be engaged with a slide groove of a left side of the disc cartridge.
Figure 29:
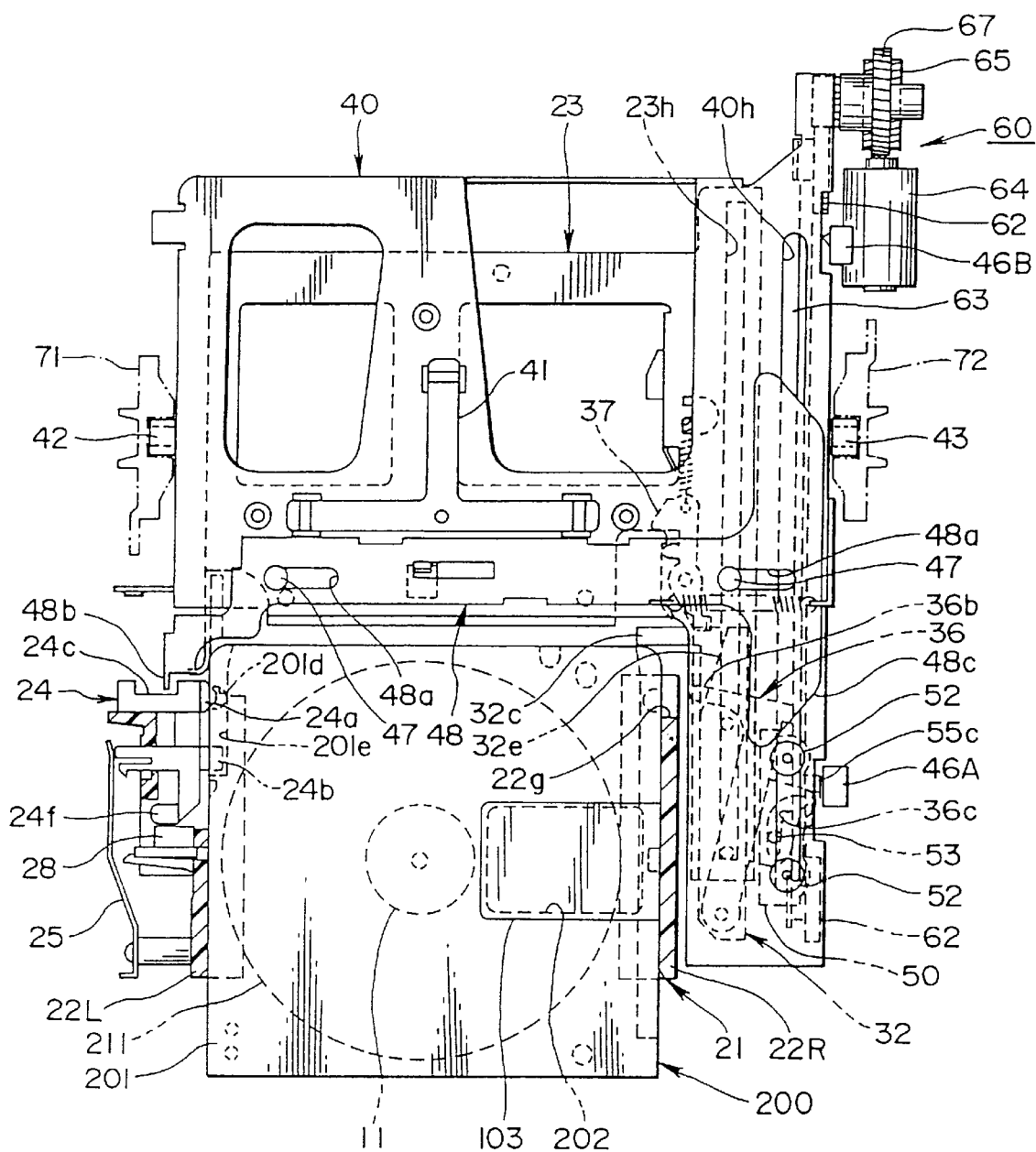
FIG. 29 is a view similar to FIG. 28, showing a first protrusion of the lock lever being engaged with a lock recess of the left side of the disc cartridge.

Referring to FIG. 28, when correctly inserting the disc cartridge 200 between the main holders 22L, 22R of the cartridge holder 21, the second protrusion 24b of the lock lever 24 is inserted into the slide groove 201e of the left side face of the disc cartridge 200. Referring to FIG. 29, with further insertion of the disc cartridge 200 therebetween, the lock recess 201d of the disc cartridge 200 is engaged with the first protrusion 24a of the lock lever 24. The first protrusion 24a serves to surely hold the disc cartridge 200 between the holder portions 22b of the main holders 22L, 22R and in the opening 12 always in the stable position. At that time, even if the disc cartridge 200 loaded between the holder portions 22b of the main holders 22L, 22R is further pressed in the loading direction, it cannot protrude further inward of the main holders 22L, 22R, i.e. on the side of the sub holder 23 due to locking thereof by the first protrusion 24a of the lock lever 24.

Figure 30:
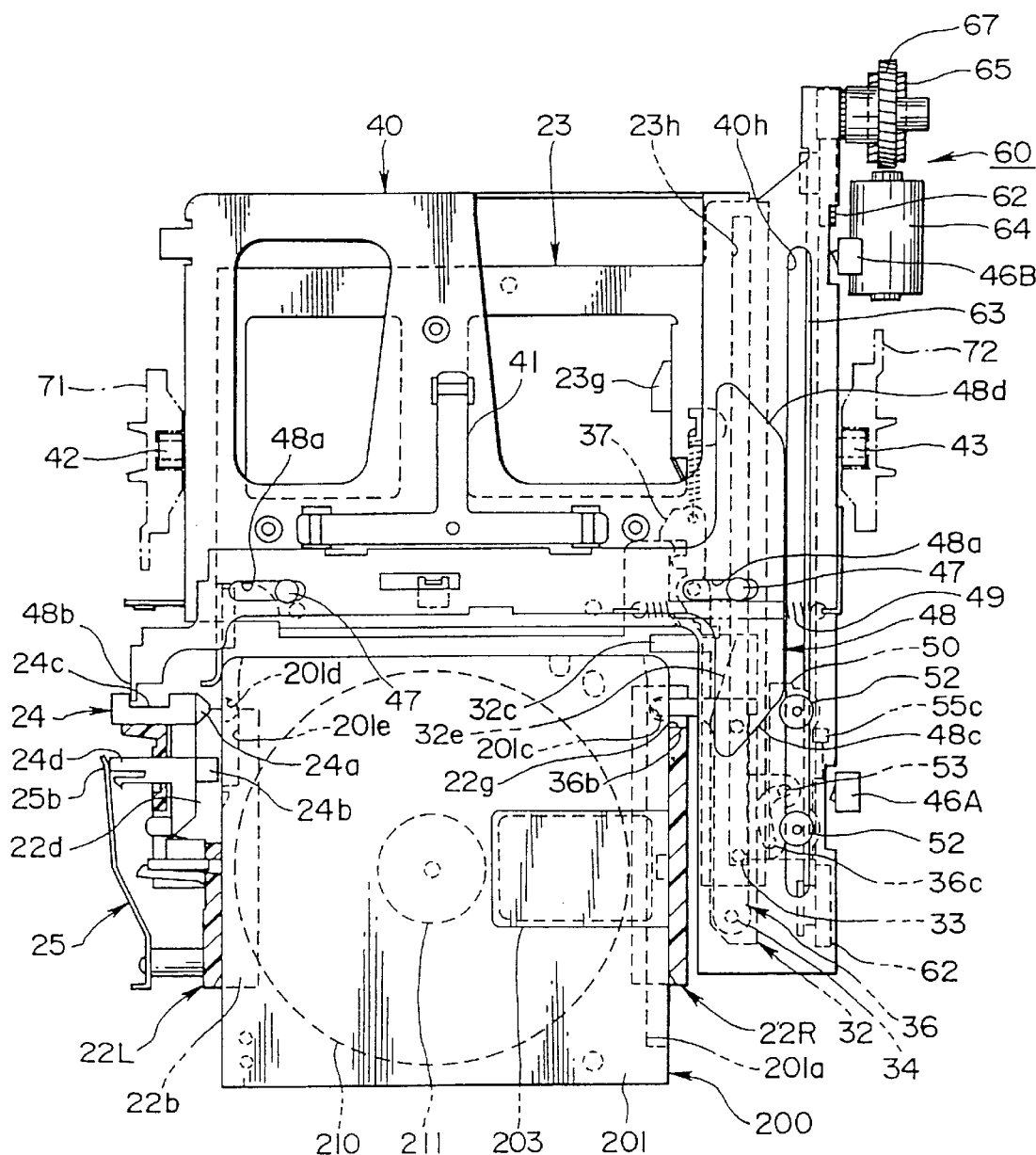
FIG. 30 is a view similar to FIG. 29, showing the disc cartridge being about to be transferred to the sub holder of the cartridge holder with locking of the disc cartridge by the lock lever removed.

Referring to FIG. 30, when pressing the reproducing button 8b of the front panel of the device main body 2 to select one of the disc cartridges 200 received in the five openings 12 of the front of the device main body 2 so as to reproduce information of the magneto-optical disc 210 accommodated therein, the motor 64 of the first drive 60 is driven to move through the timing belt 63 the loading slider 50 to the rack 72 along the guide groove 40h of the elevator chassis 40. With movement of the loading slider 50, the bar-like shaft 53 of the loading slider 50 is moved along the cam groove 36c of the loading lever 36 of the cartridge carrier 31 to swing counterclockwise or leftward as viewed in FIG. 30 the loading lever 36 through the support shaft 34 of the sub slider 32. Thus, the engagement 36b of the loading lever 36 is engaged with the lock recess 201d of the disc cartridge 200 through the recesses 22g of the side wall 22c of the right main holder 22R. At substantially the same time, one of the rollers 52 of the loading slider 50 abuts on the front taper 48c of the lock removing slider 48 to move it leftward as viewed in FIG. 30 against a resilient tensile force of the extension coil spring 49. Movement of the lock removing slider 48 makes the lock lever 24 move leftward as viewed in FIG. 30 through the engagement 48b against a resilient biasing force of the plate spring 25, removing locking of the disc cartridge 200 by the first protrusion 24a of the lock lever 24.

Figure 31:
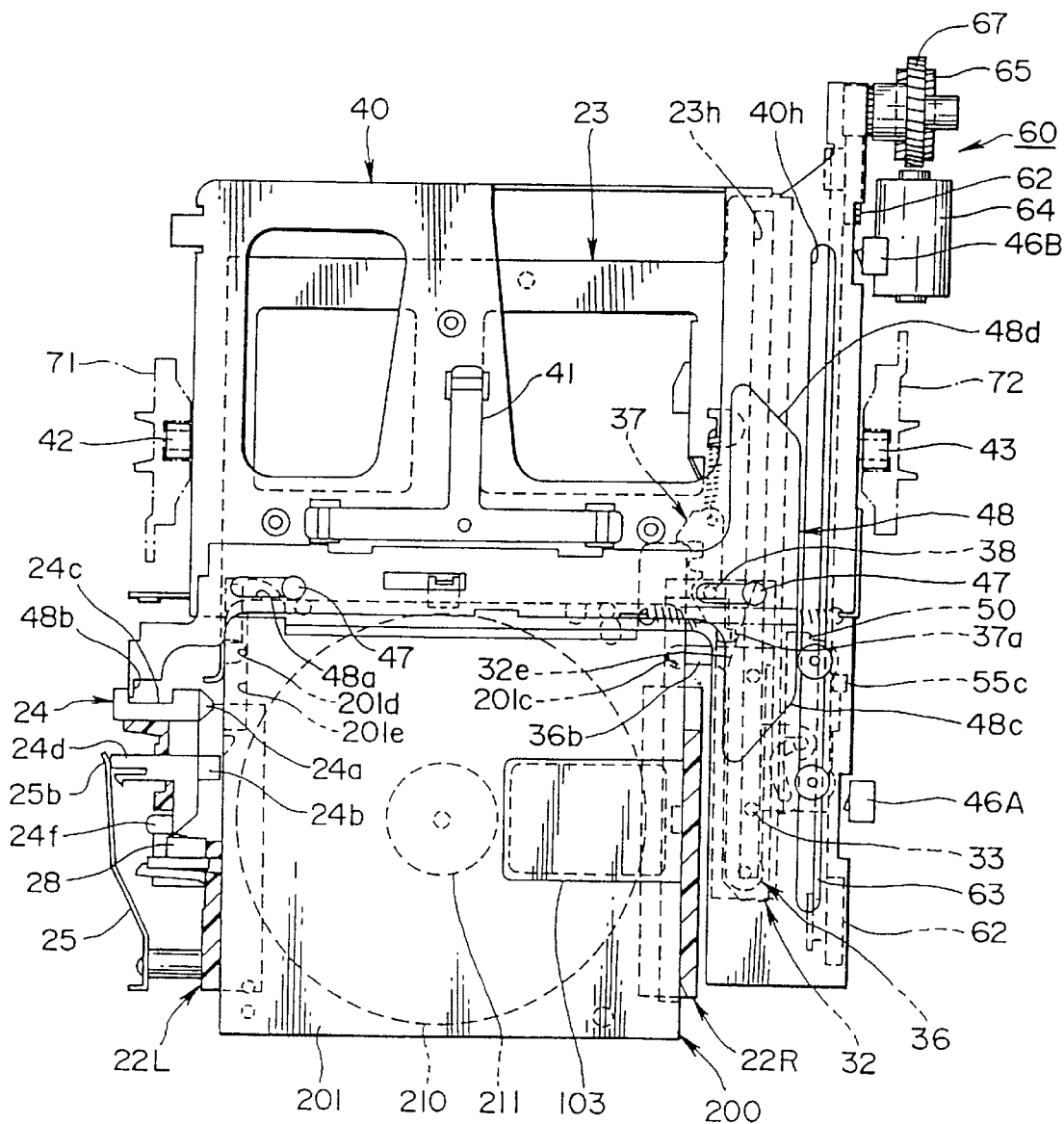
FIG. 31 is a view similar to FIG. 30, showing the disc cartridge being in transfer to the sub holder of the cartridge holder.

Referring to FIG. 31, after removing locking of the disc cartridge 200 by the lock lever 24, the loading slider 50 is further moved to the rack 72 along the guide groove 40h of the elevator chassis 40, so that the disc cartridge 200 is drawn or transferred from the main holders 22L, 22R to the sub holder 23 for loading through the engagement 36b of the loading lever 36. In such a way, a removal of locking of the first protrusion 24a of the lock lever 24 with the lock recess 201d of the disc cartridge 200 and a timing of insertion of the disc cartridge 200 into the recess 201c of the disc cartridge 200 are overlapped with each other, enabling downward movement or vertical loading of the disc cartridge 200 as will be described later by the cartridge loader 30.

Figure 32:
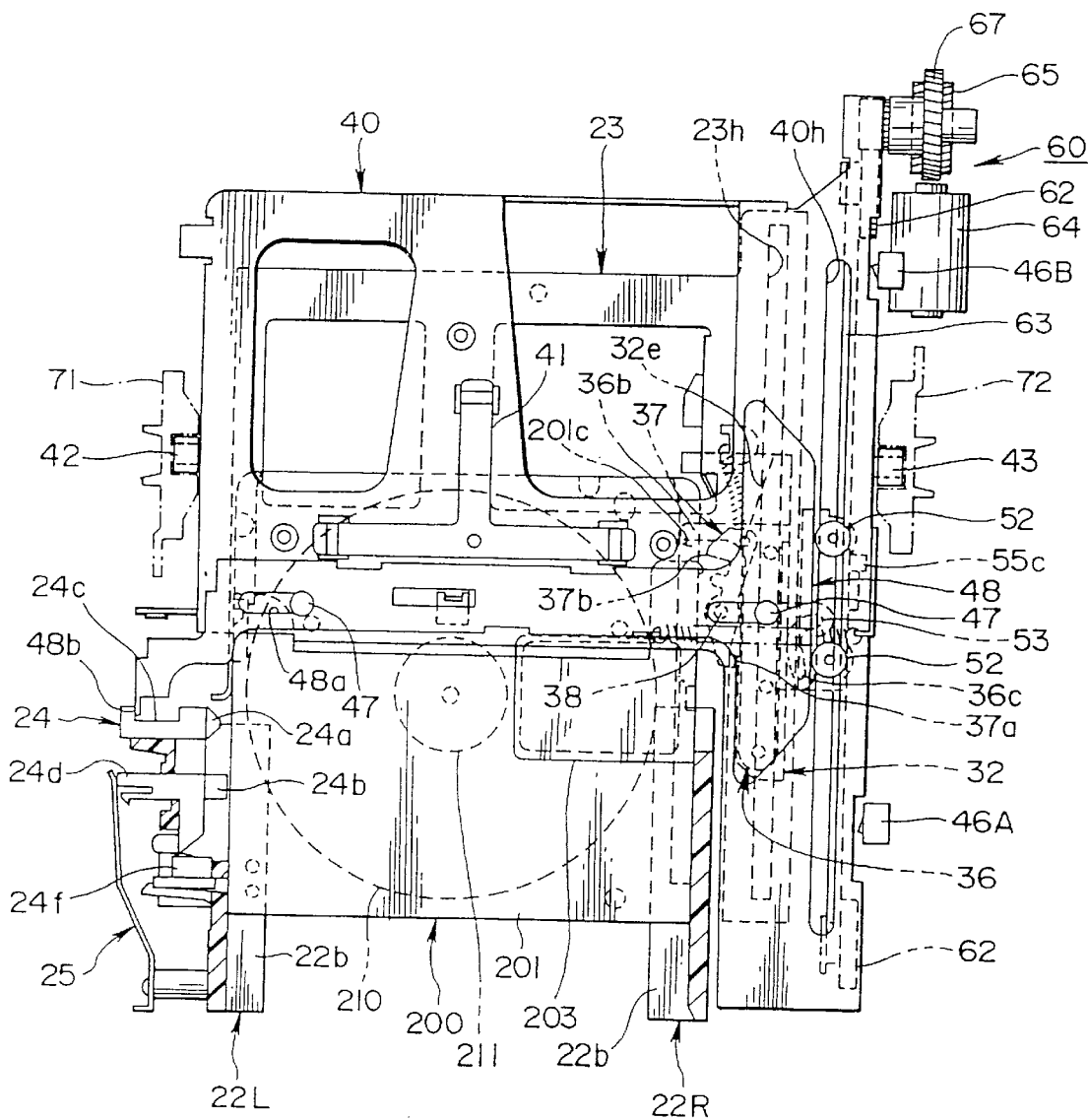
FIG. 32 is a view similar to FIG. 31, showing a shutter lever being moved from the slide groove of a right side face in the middle of transfer of the disc cartridge.

Upon start of loading operation of the disc cartridge 200, the bend 37a of the shutter lever 37 abuts on the first taper 32e of sub slider 32 of the cartridge carrier 31 as shown in FIG. 31 to swing clockwise or rightward as viewed in FIG. 32 the hook 37b of the shutter lever 37 through the support shaft 38 as shown in FIG. 32. In such a way, as shown in FIG. 32, the hook 37b of the shutter lever 37 is moved only during part of loading operation of the disc cartridge 200, surely preventing interference of the hook 37b of the shutter lever 37 with the slit-like slide groove 201a of the right side face of the disc cartridge 200, resulting in smooth and efficient loading of the disc cartridge 200 onto the sub holder 23.

Figure 33:
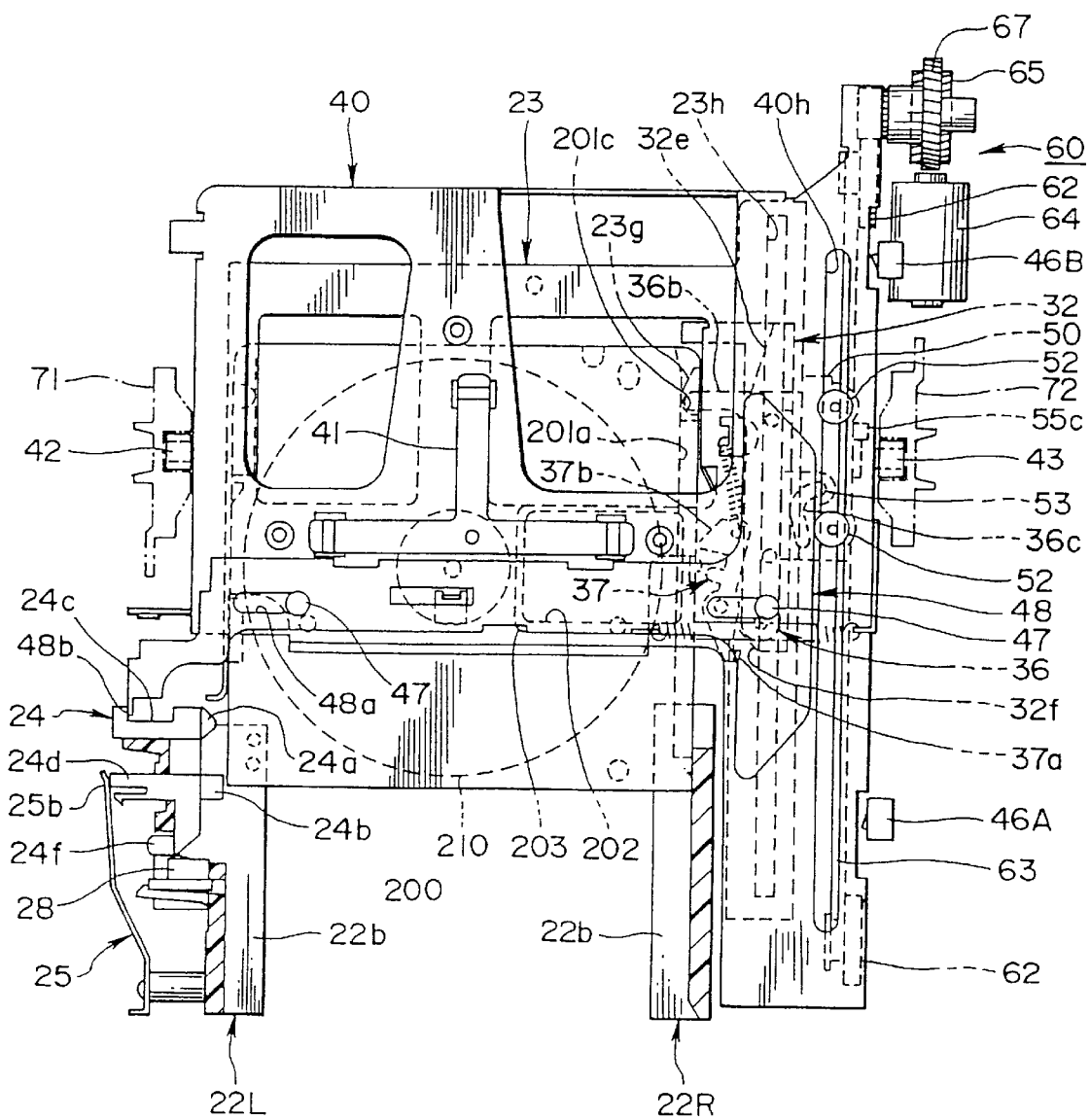
FIG. 33 is a view similar to FIG. 32, showing a shutter of the disc cartridge being about to be opened with the shutter lever returning to the initial position.

Referring to FIG. 33, when the hook 37b of the shutter lever 37 comes at the side with the hole 203b of the shutter 203 of the disc cartridge 200, i.e. comes over the slide groove 201a of the disc cartridge 200, the bend 37a of the shutter lever 37 is separated from the left side face of the sub slider 32 to return to the initial position. Thus, the end of the hook 37b of the shutter lever 37 abuts on the side with the hole 203b of the shutter 203 of the disc cartridge 200. At that time, the support 23g of the sub holder 23 abuts on the claw 204a of the lock lever 204 to remove locking of the shutter 203 by the lock lever 204.

Figure 34:
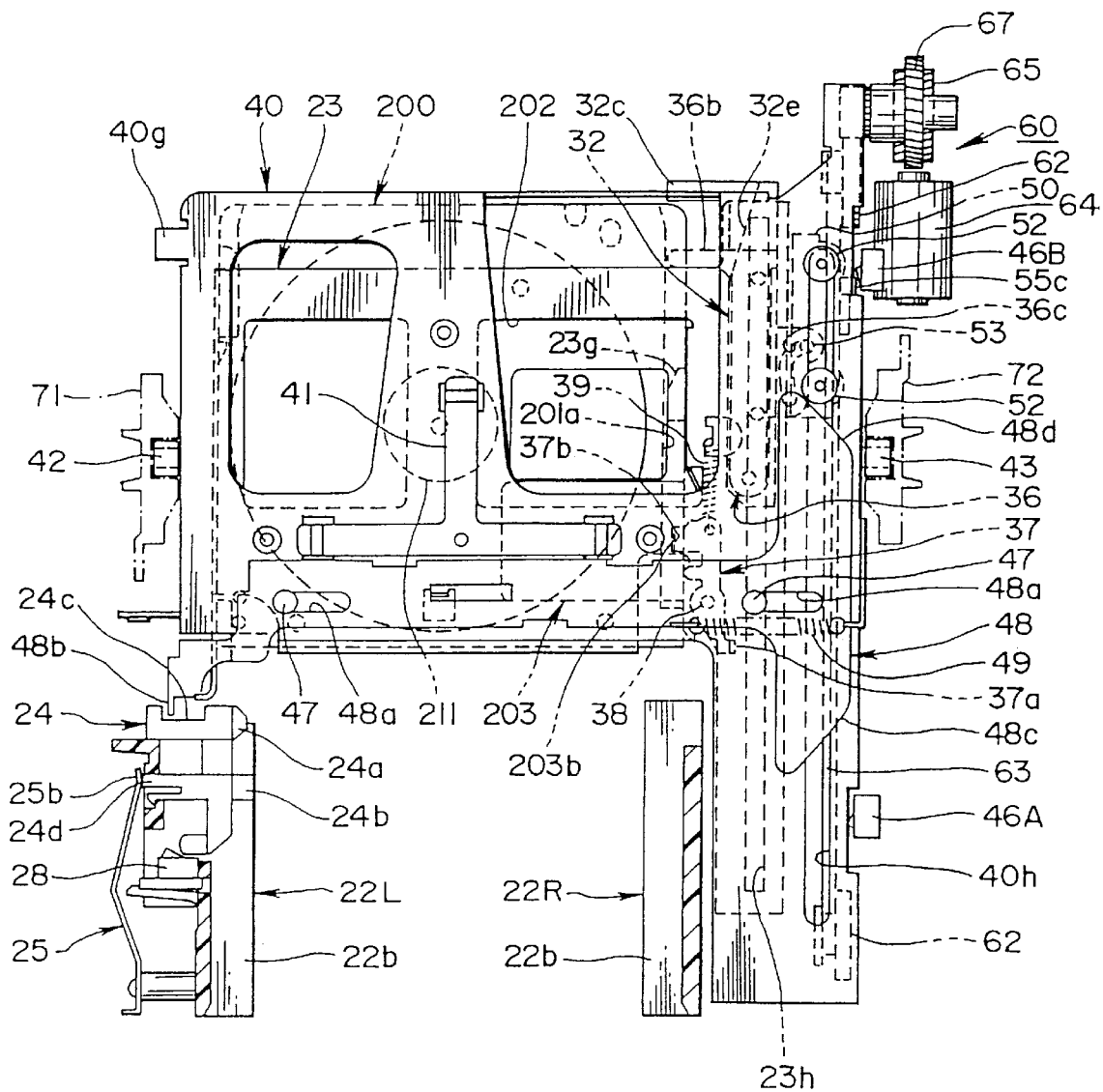
FIG. 34 is a view similar to FIG. 33, showing the disc cartridge having completely been inserted in the sub holder of the cartridge holder.

Referring to FIG. 34, with further loading of the disc cartridge 200 onto the sub holder 23, the hook 37b of the shutter lever 37 is engaged with the hole 203b of the shutter 203 of the disc cartridge 200 to open the shutter 203. FIG. 34 shows that the disc cartridge 200 is completely transferred or drawn from the main holders 22L, 22R to the sub holder 23, i.e. the completed state of horizontal loading, which is detected by the switch operation part 55c of the connecting plate 55 moved together with the loading slider 50 pressing the switch part of the rear detection switch 46B. Detection signal of the detection switch 46B is provided to the controller to control driving the motor 64 of the first drive 60.

As shown in FIG. 34, the other of the rollers 52 of the loading slider 50 is positioned at the rear taper 48d of the lock removing slider 48, so that the lock removing slider 48 is moved rightward as viewed in FIG. 34 by a resilient tensile force of the extension coil spring 49. Movement of the lock removing slider 48 separates the engagement 48b of the lock removing slider 48 from the recess 24c of the lock lever 24. Thus, the lock lever 24 is moved rightward as viewed in FIG. 34 by a resilient biasing force of the plate spring 25 to prevent another or error insertion of the disc cartridge 200 between the holder portions 22b of the vacant main holders 22L, 22R during recording/reproducing operation. The position of the holder portions 22b of the main holders 22L, 22R, i.e. the recording/reproducing address, can immediately be seen from character indication of the display 7 or lamp indication of the indicators 9a–9e arranged in the front of the device main body 2 and moved together with on-off operation of the switch part of the detection switch 28, resulting in sure prevention of error insertion of the disc cartridge 200. This is available for units with increased or decreased number of disc cartridges 200.

With completion of transfer or drawing of the disc cartridge 200 from the main holders 22L, 22R on the stationary side to the sub holder 23 on the movable side, the motor 73 of the second drive 70 is driven. A driving force of the motor 73 is transmitted to the drive gears 80, 81 through the intermediate gears 76, 78. The elevator chassis 40 supporting the sub holder 23 through the racks 71, 72 engaged with the drive gears 80, 81 are moved downward from the holder portions 22b of the main holders 22L, 22R to the chassis 101 of the recording and/or reproducing part 100. As shown in FIG. 11, when the elevator chassis 40 is moved downward as far as the horizontal lug 40g presses the switch part 91a of the detection switch 91, i.e. to the position that the elevator chassis 40 cooperates with the recording and/or reproducing part 100 to chuck the disc cartridge 200, the disc cartridge 200 held by the sub holder 23 is positioned in a predetermined position on the part chassis 101 for loading. The sub holder 23 is biased to the elevator chassis 40 always downward through the plate spring 41, so that in the above chucking position, the disc cartridge 200 is floatingly separated from the elevator chassis 40 together with the sub holder 23, and is chucked on the part chassis 101. This enables sure holding of the disc cartridge 200 in the predetermined position on the part chassis 101.

Specifically, as shown in FIG. 14, when the elevator chassis 40 is moved downward to chuck the disc cartridge 200 between the sub holder 23 and the recording and/or reproducing part 100, the sub holder 23 and the recording and/or reproducing part 100 are held in the state separated from the lower chassis 18 and the elevator chassis 40 or in the floating state through the stepped pins 29, the plate spring 41, and the dampers 102, so that the main holder 201 of the disc cartridge 200 can surely be held among the three bosses 23d of the sub holder 23, and the positioning pins 140 and position reference seals 142 on the part chassis 101. Further, since the sub holder 23 and the recording and/or reproducing part 100 are held in the state separated from the lower chassis 18 and the elevator chassis 40 or in the floating state, external disturbances such as shock and vibration applied to the device main body 2 are difficult to be transmitted to the recording and/or reproducing part 100, enabling always stable and accurate recording/reproducing operation. Furthermore, only the sub holder 23 and the recording and/or reproducing part 100 of the cartridge changer 20 are constructed to float with respect to the lower chassis 18 and the elevator chassis 40, enabling not only simplified structure and reduced size of the units such as the dampers compared with the case that the whole cartridge changer 20 floats, e.g. with respect to the device main body 2, but largely reduced number of component parts and manufacturing cost. Those facts contribute to further reduction in size/thickness, weight, and manufacturing cost of the whole disc recording and/or reproducing part 1 with the cartridge changer 20.

As indicated by the fully-drawn lines in FIG. 9 and the one-dot chain lines in FIG. 24, the flat portion 159a of the lever 159 is lowered through the taper 158b of the cam gear 158 during transfer of the disc cartridge 200 or reproducing operation of the magneto-optical disc 210, so that the second detection switch 162 is turned on, and the head mounting plate 133 having the magnetic head 136 mounted through the gimbals 135 is moved upward to the position that it fails to obstruct action of the cartridge loader 30 for transferring the disc cartridge 200. When a recording command is given, the motor 151 of the head mover 150 Bis driven to rotate the cam gear 158 in a predetermined direction through the intermediate gears 154, 156. Thus, the flat portion 159a of the lever 159 is moved upward through the protrusion 159c disposed on the taper 158b of the cam gear 158 to remove the operation lug 133c of the head mounting plate 133 held by the flat portion 159a of the lever 159. Then, the head mounting plate 133 falls down on the side of the optical pickup 110 by a resilient force of the torsion coil spring 134, so that the magnetic head 136 contacts the magneto-optical disc 210 to be in the recordable state. At that time, the first detection switch 161 is turned on by the rear protrusion 159d of the lever 159 to stop driving of the motor 151.

When a reproducing command or a disc-cartridge transfer command is given during recording operation, the motor 151 of the head mover 150 is driven in the opposite direction to rotate the cam gear in the opposite direction through the intermediate gears 154, 156. Thus, the flat portion 159a of the lever 159 is moved downward through the protrusion 159c disposed on the taper 158b of the cam gear 158 to depress the operation lug 133c of the head mounting plate 133. This moves the head mounting plate 133 upward against a resilient force of the torsion coil spring 134. In that state, the cartridge carrier 31 of the cartridge loader 30, the sub holder 23, etc. can vertically be moved together with the elevator chassis 40.

In such a way, the head mover 150 for moving the magnetic head 136 from the vertical locus of the cartridge carrier 31 of the cartridge loader 30, i.e. the vertical locus of the elevator chassis 40, is arranged in the rear of the lower chassis 18 of the device main body 2, enabling a further reduction in size/thickness of the whole disc recording and/or reproducing device 1 with the cartridge changer 20 for successively selecting one of the five disc cartridges 200 for recording and/or reproducing operation. Moreover, due to no need of arranging the recording head 130 in the cartridge loader 30 of the cartridge changer 20, etc., positioning of the magnetic head 136 of the recording head 130 and a laser emitter of the optical pickup 110 is not necessary, enabling simplified structure of the cartridge changer 20, resulting in further reduction in manufacturing cost of the whole device.

Figure 35:
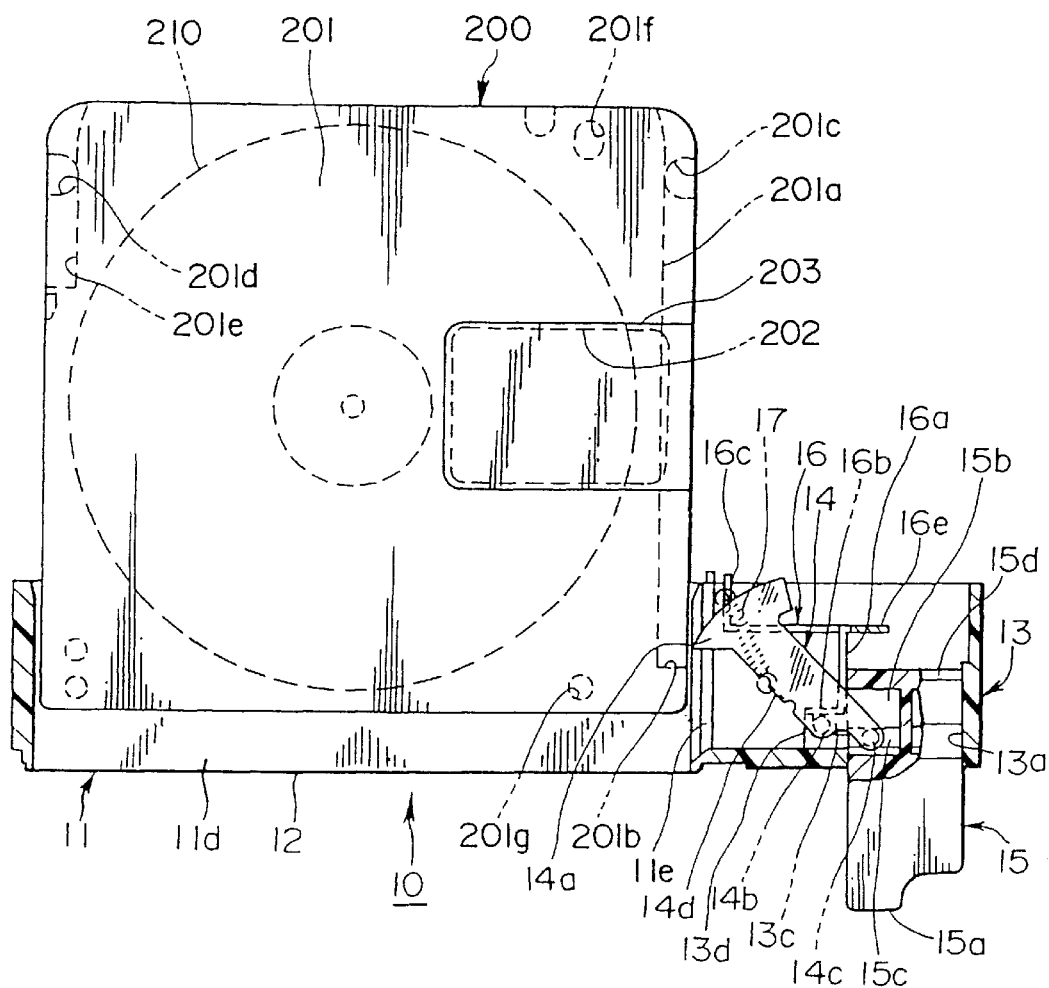
FIG. 35 is a view similar to FIG. 34, showing the cartridge ejector before ejecting the disc cartridge.

Next, a description will be made with regard to eject action of the disc cartridge 200 by the cartridge ejector 10 of the disc recording and/or reproducing device 1. Referring to FIG. 35, before ejecting the disc cartridge 200 from the opening 12 of the holder 11 of the cartridge ejector 10, the end 14a of the eject lever 14 disposed to correspond to the opening 12 withdraws in the box 13 of the holder 11 to be positioned in the slit 11e of the right side wall ha of the holder 11. That is, the end 14a of the eject lever 14 is separated from the end 201b of the slide groove 201a of the disc cartridge 200. Usually, the eject lever 14 is drawn to the bend 16c of the mounting plate 16 by the extension coil spring 17 to allow the support pin 14b of the eject lever 14 to rotate in abutting on the protrusion 13d of the horizontal guide recess 13c. The structure that the support pin 14b is loosely engaged with the guide groove 15c of the eject button 15 allows a sequence of rotation of the eject lever 14 and linear movement of the eject button 15.

Figure 36:
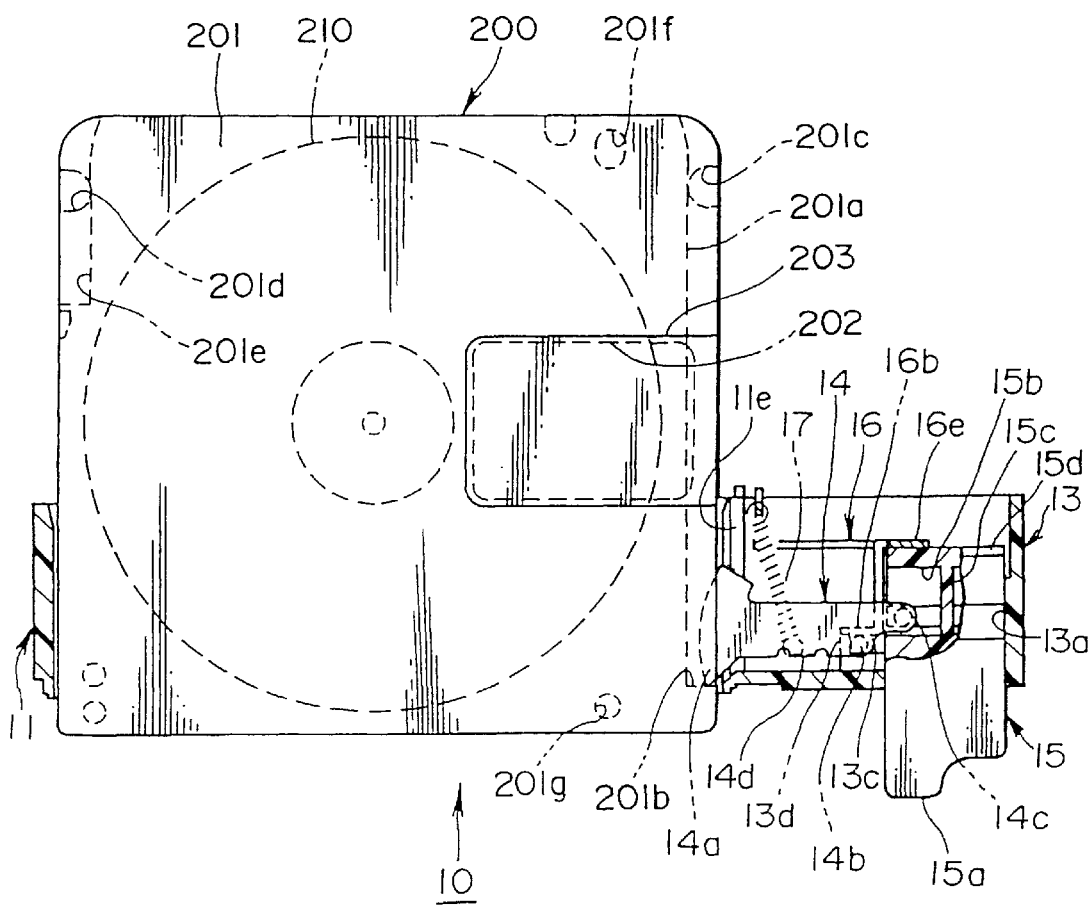
FIG. 36 is a view similar to FIG. 35, showing the cartridge ejector after ejecting the disc cartridge.
Figure 37:
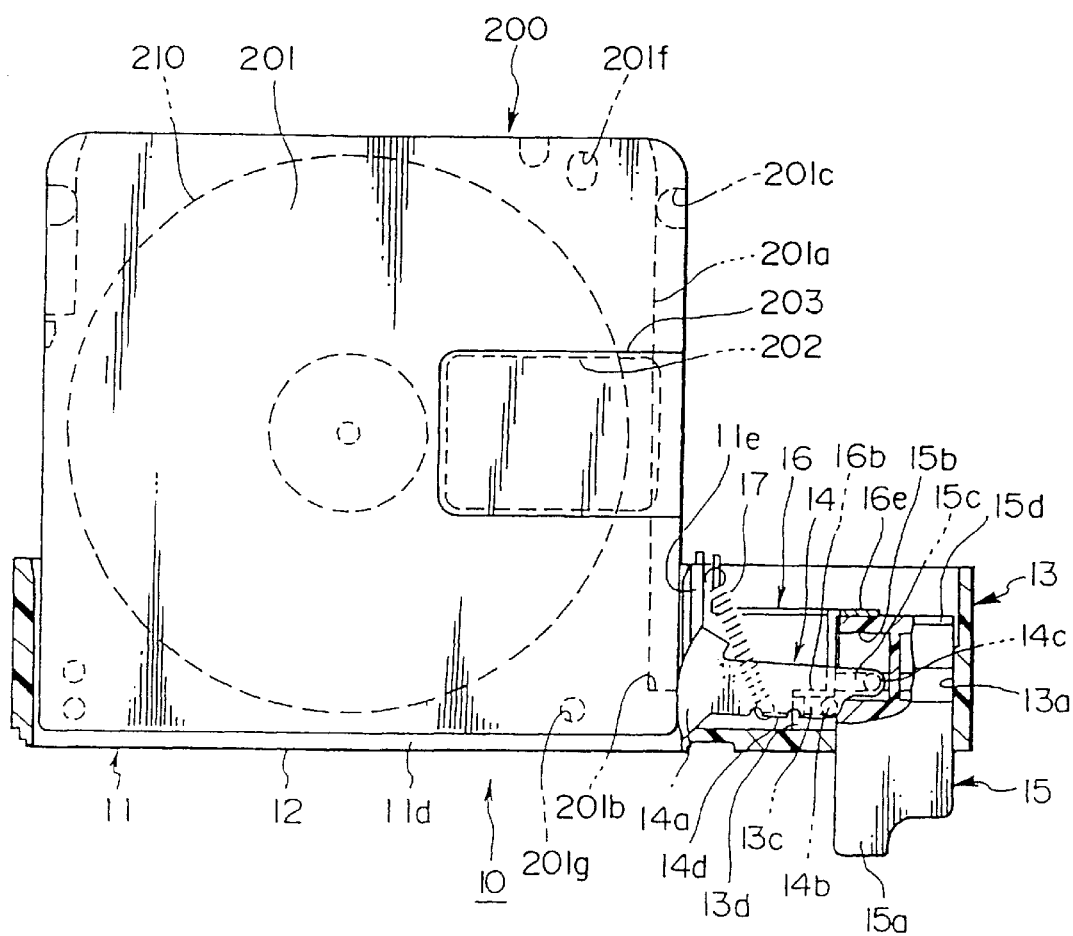
FIG. 37 is a view similar to FIG. 36, showing accommodation of the disc cartridge with the eject button kept pressed by slide movement of the eject lever of the cartridge ejector to the eject button.

Referring to FIG. 36, when pressing the operation part 15a of the eject button 15, the eject button 15 is moved backward or inward of the device main body 2. Movement of the eject button 15 rotates the eject lever 14 counter-clockwise as viewed in FIG. 36 about the support pin 14b. Rotation of the eject lever 14 makes the end 14a of the eject lever 14 protrude into the opening 12 through the slit 11e to press the end 201b of the slide groove 201a of the disc cartridge 200 accommodated in the opening 12. Thus, the disc cartridge 200 is guided by the opening 12 to be ejected forward.

Due to the fact that the eject buttons 15 are pressed manually, the eject button 15 of the opening 12 corresponding to the disc cartridge 200 which is being loaded by the cartridge loader 30 may be pressed by mistake. In that case, a portion of the right side face of the disc cartridge 200 without the slide groove 201a and the end 14a of the eject lever 14 are moved to interfere with each other. However, referring to FIG. 37, the support pin 14b of the eject lever 14 is moved to the left side face of the eject button along the horizontal guide recess 13c against a resilient tensile force of the extension coil spring 17. Specifically, the support pin 14b is usually positioned on the side of the protrusion 13d of the horizontal guide recess 13c by a resilient tensile force of the extension coil spring 17. When the right side face of the disc cartridge 200 and the end 14a of the eject lever 14 interfere with each other as described above, the eject lever 14 is parallelly moved to the eject button 15 against a resilient tensile force of the extension coil spring 17. Thus, the end 14a of the eject lever 14 withdraws in the box 13 to prevent interference of the end 14a of the eject lever 14 with the right side face of the disc cartridge 200. And with the interference removed, the eject lever 14 returns to the initial position by a resilient tensile force of the extension coil spring 17.

As shown in FIGS. 1 and 3, the operation part 15a exposed from the opening 13a of the box 13 of the eject button 15 (which corresponds to the opening 2a–2e of the front panel of the device main body 2) is constructed such that the right and left halves protrude alternately, so that even if a space is narrower between the two adjacent eject buttons 15, the operation part 15a of a desired eject button 15 can easily surely be pressed.

In such a way, pressing of the operation part 15a of the eject button 15 disposed to correspond to the opening 12 of the holder 11 enables separate and easy ejection of the disc cartridge 200 accommodated in the opening 12 through the eject lever 14 which operates together with the eject button 15. Further, due to arrangement of the eject button 15, etc.

to each opening 12, the disc cartridge 200 except that one which is in being loaded can surely be ejected even during operation of the cartridge loader 30. That is, the cartridge ejector 10 for ejecting the disc cartridge 200 and the cartridge loader 30 for loading the disc cartridge 200 to the recording and/or reproducing part 100 are arranged separately, resulting in easy and sure ejection of a desired disc cartridge 200, and increased degree of freedom of the cartridge loader 30, etc. Furthermore, the disc cartridge 200 is surely ejected by less number of component parts such as the eject lever 14, eject button 15, and extension coil spring 17, enabling simplified structure and reduced manufacturing cost of the cartridge ejector 10.

Having described the present invention with regard to the preferred embodiment, it is noted that the present invention is not limited thereto, and various changes and modifications can be made without departing from the scope of the present invention. By way of example, resilient members for biasing the eject lever 14, the sub holder 23, the lock lever 24, etc. may be a torsion coil spring and a rubber in place of an extension coil spring and a metallic plate spring. Moreover, the number of disc cartridges 200 may be 2–4 or six or more in place of five. Finally, the present invention is not limited to disc players for recording and/or reproducing use, but applicable to disc players for exclusive reproducing use.

What is claimed is:

1. A recording and reproducing device adapted to a cartridge accommodating a recordable optical disc, the cartridge being formed with an opening and a groove in one side face thereof, the cartridge including a shutter for opening and closing the opening through the groove, the device comprising:
    a) at least one holder arranged on a main body of the device, said holder being formed with an opening on the front side of said main body, said holder holding the cartridge inserted from said opening of said holder;
    b) a recording and reproducing part arranged to record and reproduce information on the disc;
    c) a locking unit arranged to lock the cartridge held by said holder, said locking unit including a lock lever including:
        1) a first protrusion engaged with the cartridge normally inserted from said opening of said holder; and
        2) a second rectangular-plate protrusion preventing error insertion of the cartridge therefrom, both the first and the second protrusions being fixedly attached to a single lock lever; and
    d) a carrier moveably arranged between said holder and said part, said carrier transferring the cartridge from said holder to said part, wherein said carrier includes:
        1) a lock remover including a lock removing lever for removing a locking of the cartridge by said locking unit when taking out the cartridge from said holder;
        2) a loading lever engaged with the cartridge with locking removed to take it out from said holder; and
        3) a loading slider for moving said loading lever and operating said lock removing lever.

2. A device as claimed in claim 1, wherein said locking unit includes a biasing member for biasing said lock lever in the direction of protruding into said holder.

3. A device as claimed in claim 1, wherein said carrier further includes a shutter opener for opening the shutter of the cartridge taken out from said holder.

4. A device as claimed in claim 1, further comprising an ejector arranged to eject the cartridge held by said holder, said ejector including at least one eject button arranged to said main body of the device, an eject lever operated by said eject button, and a resilient unit for returning said eject lever to an initial position, said eject lever being rotatably arranged between a first position where it protrudes in said holder to eject the cartridge held thereby and a second position where it withdraws from said holder,
    wherein when operating said eject button, said eject lever is moved from said second position to said first position to engage with an end of the groove of the cartridge held by said holder for ejection thereof.

5. A device as claimed in claim 4, wherein said eject lever is arranged to said main body of the device to be movable to the second position even with said eject button operated.

6. A device as claimed in claim 5, wherein said eject button is disposed in the vicinity of said opening of said holder.

7. A device as claimed in claim 4, further comprising a damper arranged between said main body of the device and said recording and reproducing part,
    said carrier including a sub holder movably arranged thereto for holding the cartridge taken out from said holder,
    whereby said part having the cartridge disposed thereon and said sub holder are movable with respect to said main body of the device and said carrier.

8. A device as claimed in claim 7, wherein said recording and reproducing part includes a positioning unit for positioning the cartridge disposed thereon, and said sub holder includes a pressing portion for pressing the cartridge to said part.

9. A device as claimed in claim 8, wherein said carrier further includes a biasing member for biasing said sub holder to said recording and reproducing part.

10. A device as claimed in claim 9, wherein said sub holder is hangingly mounted to said carrier.

11. A device as claimed in claim 10, wherein said sub holder is formed with stepped pins, and said carrier is formed with holes for receiving said stepped pins.

12. A recording and reproducing device adapted to cartridges accommodating recordable optical discs, each cartridge being formed with an opening and a groove in one side face thereof, each cartridge including a shutter for opening and closing the opening through the groove, the device comprising:
    a) holders arranged on a main body of the device, each holder being formed with an opening on the front side of said main body, each holder holding the cartridge inserted from said opening of said holder;
    b) a recording and reproducing part arranged to record and reproduce information on the disc;
    c) a locking unit arranged to lock the cartridge held by said holder, said locking unit including lock levers for locking the cartridges in said holders, each lock lever including:
        1) a first protrusion engaged with the cartridge normally inserted from said opening of said holder; and
        2) a second rectangular-plate protrusion preventing error insertion of the cartridge therefrom, both the first and the second protrusions being fixedly attached to a single lock lever; and
    d) a carrier movably arranged between said holder and said part, said carrier transferring the cartridge from said holder to said part, wherein said carrier includes:
        1) a lock remover including a lock removing lever for removing a locking of the cartridge by said locking unit when taking out the cartridge from said holder;

2) a loading lever engaged with the cartridge with locking removed to take it out from said holder; and 3) a loading slider for moving said loading lever and operating said lock removing lever.

13. A device as claimed in claim 12, wherein said locking unit includes a biasing member for biasing said lock lever in the direction of protruding into said holder.

14. A device as claimed in claim 12, wherein said carrier further includes a shutter opener for opening the shutter of the cartridge taken out from said holder.

15. A device as claimed in claim 12, further comprising an ejector arranged to eject the cartridges held in said holders, said ejector including eject buttons arranged on said main body of the device, eject levers operated by said eject buttons, and resilient units for returning said eject levers to initial positions, each eject lever being rotatably arranged between a first position where it protrudes in said holder to eject the cartridge held therein and a second position where it withdraws from said holder, wherein when operating one of said eject buttons, said eject lever corresponding thereto is moved from said second position to said first position to engage with an end of the groove of the cartridge held by said holder for ejection thereof.

16. A device as claimed in claim 15, wherein said eject lever is arranged to said main body of the device to be movable to the second position even with said eject button operated.

17. A device as claimed in claim 15, wherein said holders are arranged having said openings adjacent to each other, and said eject buttons are disposed in the vicinity of said openings of said holders, respectively.

18. A device as claimed in claim 17, wherein said eject buttons are formed on the fronts thereof, each eject button with protrusions each of which protrudes forward from said main body of the device and is narrower in width than said eject button, adjacent two of said protrusions being adjacent and said protrusions offset with each other in a predetermined direction.

19. A device as claimed in claim 17, wherein said holders are arranged in an upper portion of the front of said main body of the device, and said recording and reproducing part is arranged in a lower portion of the rear of said main body.

20. A device as claimed in claim 18, wherein said protrusion of said eject button is arranged to longitudinally be offset from the center of the front of said eject button, said protrusion including right and left half portions which protrude alternately.

21. A device as claimed in claim 12, wherein said recording and reproducing part includes a magnetic head for providing an external magnetic field to the disc and an optical pickup for applying light beam thereto.

22. A device as claimed in claim 21, further comprising a head mover arranged to move said magnetic head to a predetermined position for recording information on the disc, said head mover moving said magnetic head out of a transfer course of said carrier at least when the disc is transferred by said carrier.

23. A device as claimed in claim 22, wherein said head mover moves said magnetic head between a first position for recording information on the disc and a second position out of said transfer course of said carrier.

24. A device as claimed in claim 23, wherein said carrier moves along a first transfer course for taking out the cartridge from said holder and a second transfer course defined perpendicular to said first transfer course for loading onto said recording and reproducing part the cartridge taken out from said holder, said second position being located outside said second transfer course.

25. A device as claimed in claim 24, wherein said recording and reproducing part include an arm having a pointed end mounted to said magnetic head and a base end connected to said optical pickup, said head mover rotating said arm between said first position and said second position.

26. A device as claimed in claim 25, wherein said head mover includes a cam for rotating said arm between said first position and said second position and a drive for driving said cam.

27. A device as claimed in claim 22, further comprising a damper arranged between said main body of the device and said recording and reproducing part, said carrier including a sub holder movably arranged thereto for holding the cartridge taken out from said holder, whereby said part having the cartridge disposed thereon and said sub holder are movable with respect to said main body of the device and said carrier.

28. A device as claimed in claim 27, wherein said recording and reproducing part includes a positioning unit for positioning the cartridge disposed thereon, and said sub holder includes a pressing portion for pressing the cartridge to said part.

29. A device as claimed in claim 28, wherein said carrier further includes a biasing member for biasing said sub holder to said recording and reproducing part.

30. A device as claimed in claim 29, wherein said sub holder is hangingly mounted to said carrier.

31. A device as claimed in claim 30, wherein said sub holder is formed with stepped pins, and said carrier is formed with holes for receiving said stepped pins.

* * * * *

UNITED STATES PATENT AND TRADEMARK OFFICE
CERTIFICATE OF CORRECTION

PATENT NO. : 6,396,794 B1
DATED : May 28, 2002
INVENTOR(S) : Takashi Tsugami et al.

It is certified that error appears in the above-identified patent and that said Letters Patent is hereby corrected as shown below:

Column 19,
Line 26, change "Bis" to -- is --.

Column 20,
Line 8, change "ha" to -- 11a --.

Column 22,
Line 34, change "9" to -- 8 --.

Signed and Sealed this

Seventh Day of September, 2004

JON W. DUDAS
*Director of the United States Patent and Trademark Office*